(12) United States Patent
Yajima et al.

(10) Patent No.: US 12,454,310 B2
(45) Date of Patent: Oct. 28, 2025

(54) STEERING DEVICE AND STEERING METHOD

(71) Applicants: TOYOTA JIDOSHA KABUSHIKI KAISHA, Toyota (JP); JTEKT CORPORATION, Kariya (JP)

(72) Inventors: Amane Yajima, Kanagawa-ken (JP); Yoshio Kudo, Machida (JP); Koji Anraku, Okazaki (JP); Isao Namikawa, Okazaki (JP); Kenji Yoshida, Nagoya (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 524 days.

(21) Appl. No.: 17/695,017

(22) Filed: Mar. 15, 2022

(65) Prior Publication Data
US 2022/0332364 A1 Oct. 20, 2022

(30) Foreign Application Priority Data

Apr. 15, 2021 (JP) ................. 2021-069213

(51) Int. Cl.
*B62D 6/00* (2006.01)
*B62D 5/00* (2006.01)

(52) U.S. Cl.
CPC .............. *B62D 6/00* (2013.01); *B62D 5/006* (2013.01)

(58) Field of Classification Search
CPC ........ B62D 6/00; B62D 5/006; B62D 5/0484; B62D 5/049; B62D 6/02; B62D 6/008; B62D 5/04
(Continued)

(56) References Cited

U.S. PATENT DOCUMENTS

2001/0052756 A1   12/2001   Noro et al.
2014/0163822 A1   6/2014   Strecker et al.
(Continued)

FOREIGN PATENT DOCUMENTS

JP   2001-278088 A   10/2001
JP   2003-002223 A   1/2003
(Continued)

*Primary Examiner* — Scott A Reinbold
(74) *Attorney, Agent, or Firm* — Sughrue Mion, PLLC

(57) ABSTRACT

In a reaction torque calculation process, an electronic control unit included in a steer-by-wire steering device is configured to calculate a distributed axial force obtained by distributing an angle axial force and an electric current axial force based on a final distribution ratio. The reaction torque calculation process includes at least one of a first abnormal-time process and a second abnormal-time process. The first abnormal-time process is executed to hold, for calculation of the angle axial force, a vehicle speed signal value immediately before the vehicle speed signal becomes abnormal. The second abnormal-time process is executed to hold, for calculation of a normal-time distribution ratio, a vehicle speed signal value immediately before the vehicle speed signal becomes abnormal or hold a value of the normal-time distribution ratio immediately before the vehicle speed signal becomes abnormal, and then gradually change the final distribution ratio to an abnormal-time distribution ratio.

19 Claims, 15 Drawing Sheets

(58) Field of Classification Search
USPC .......................................................... 180/446
See application file for complete search history.

(56) References Cited

U.S. PATENT DOCUMENTS

| | | | |
|---|---|---|---|
| 2020/0130179 A1* | 4/2020 | Hu | G05D 1/0214 |
| 2020/0283059 A1* | 9/2020 | Kodera | B62D 6/008 |
| 2022/0009546 A1* | 1/2022 | Mori | B62D 5/049 |

FOREIGN PATENT DOCUMENTS

| | | |
|---|---|---|
| JP | 2020-142596 A | 9/2020 |
| JP | 2020-185920 A | 11/2020 |

* cited by examiner

FIG. 1
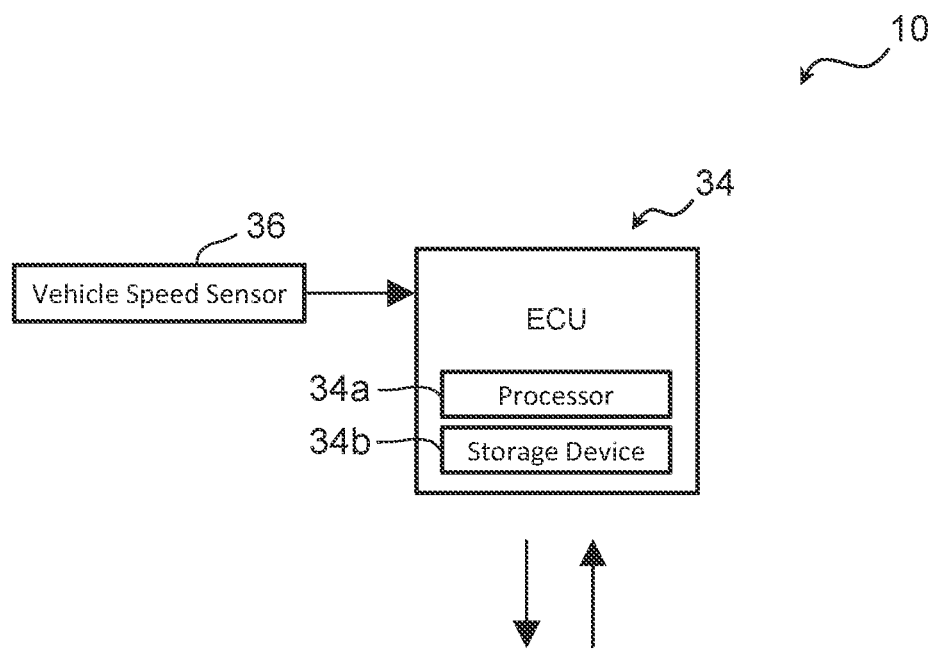
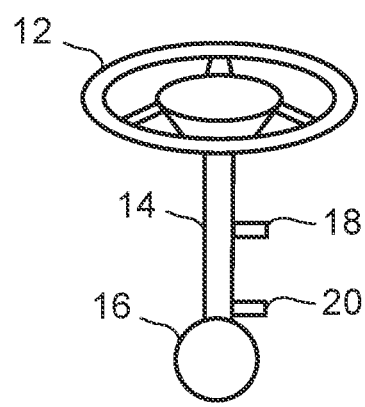
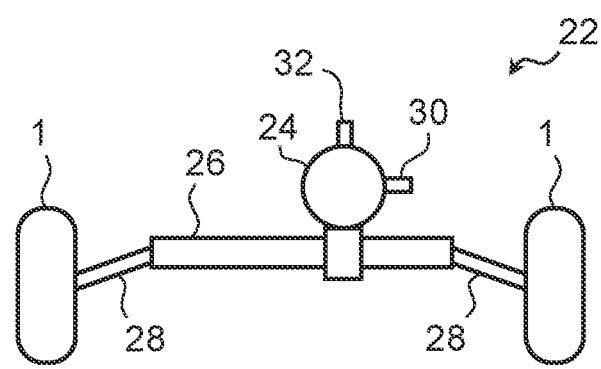

<First Abnormal-Time Process>

<First Release Process>

<Fourth Abnormal-Time Process (Vehicle Speed Holding)>

<Sixth Release Process>

STEERING DEVICE AND STEERING METHOD

CROSS-REFERENCE TO RELATED APPLICATION

The present disclosure claims priority under 35 U.S.C. § 119 to Japanese Patent Application No. 2021-069213, filed on Apr. 15, 2021, which is incorporated herein by reference in its entirety.

BACKGROUND

Technical Field

The present disclosure relates to a steering device of a steer-by-wire type and a steering method thereof.

Background Art

JP 2003-002223 A discloses a steering device of a steer-by-wire type. In this steering device, when the upper limit value of the output of a steering actuator is limited to prevent overload, the reaction force generated by the steering actuator is increased in order to prevent a decrease in the responsiveness of the change in the turning angle of a wheel with respect to the operation of an operating member.

SUMMARY

In a steering device of a steer-by-wire type, when the vehicle speed signal of a vehicle speed sensor is used for calculating a steering reaction torque, if the vehicle speed signal becomes abnormal, an unintended steering reaction torque may be output.

The present disclosure has been made in view of the problem described above, and an object of the present disclosure is to provide a steering device and a steering method that can reduce an output of unintended steering reaction torque when a vehicle speed signal becomes abnormal.

A steering device of a steer-by-wire type according to the present disclosure includes a steering wheel, a reaction force actuator, and an electronic control unit. The steering wheel is mechanically separated from a turning wheel. The reaction force actuator is configured to apply a steering reaction torque to the steering wheel. The electronic control unit is configured to control the reaction force actuator and execute a reaction torque calculation process to calculate a target reaction torque which is a target value of the steering reaction torque. In the reaction torque calculation process, the electronic control unit is configured to: calculate, as axial forces acting to a turning shaft connected to the turning wheel, an angle axial force based on a vehicle speed signal of a vehicle speed sensor and a turning angle of the turning wheel, and an electric current axial force based on an electric current for driving the turning wheel; calculate, based on a final distribution ratio, a distributed axial force obtained by distributing the angle axial force and the electric current axial force; and calculate the target reaction torque based on the distributed axial force. When the vehicle speed signal is normal, the final distribution ratio is a normal-time distribution ratio based on the vehicle speed signal, and when the vehicle speed signal is abnormal, the final distribution ratio is an abnormal-time distribution ratio where a distribution ratio of the electric current axial force is 100%. The reaction torque calculation process includes at least one of a first abnormal-time process and a second abnormal-time process executed when the vehicle speed signal becomes abnormal. The first abnormal-time process is executed to hold, for calculation of the angle axial force, a vehicle speed signal value immediately before the vehicle speed signal becomes abnormal. The second abnormal-time process is executed to hold, for calculation of the normal-time distribution ratio, a vehicle speed signal value immediately before the vehicle speed signal becomes abnormal or hold a value of the normal-time distribution ratio immediately before the vehicle speed signal becomes abnormal, and then gradually change the final distribution ratio to the abnormal-time distribution ratio.

A steering method applied to a vehicle of a steer-by-wire type according to the present disclosure includes a reaction torque calculation process to calculate a target reaction torque which is a target value of a steering reaction torque applied to a steering wheel mechanically separated from a turning wheel. The reaction torque calculation process includes: a process to calculate, as axial forces acting to a turning shaft connected to the turning wheel, an angle axial force based on a vehicle speed signal of a vehicle speed sensor and a turning angle of the turning wheel, and an electric current axial force based on an electric current for driving the turning wheel, a process to calculate, based on a final distribution ratio, a distributed axial force obtained by distributing the angle axial force and the electric current axial force, wherein when the vehicle speed signal is normal, the final distribution ratio is a normal-time distribution ratio based on the vehicle speed signal, and when the vehicle speed signal is abnormal, the final distribution ratio is an abnormal-time distribution ratio where a distribution ratio of the electric current axial force is 100%; and a process to calculate the target reaction torque based on the distributed axial force. The reaction torque calculation process further includes at least one of a first abnormal-time process and a second abnormal-time process executed when the vehicle speed signal becomes abnormal. The first abnormal-time process is executed to hold, for calculation of the angle axial force, a vehicle speed signal value immediately before the vehicle speed signal becomes abnormal. The second abnormal-time process is executed to hold, for calculation of the normal-time distribution ratio, a vehicle speed signal value immediately before the vehicle speed signal becomes abnormal or hold a value of the normal-time distribution ratio immediately before the vehicle speed signal becomes abnormal, and then gradually change the final distribution ratio to the abnormal-time distribution ratio.

According to each of the steering device and the steering method of the present disclosure, when the vehicle speed signal becomes abnormal, the reaction torque calculation process is executed in association with at least one of the above-described first abnormal-time process and second abnormal-time process. Therefore, when the vehicle speed signal becomes abnormal, unintended fluctuation of at least one of the angle axial force and the normal-time distribution ratio can be reduced, and as a result, the output of the unintended steering reaction torque can be reduced.

BRIEF DESCRIPTION OF THE DRAWINGS

FIG. 1 is a diagram schematically showing an example of a configuration of a steering device according to a first embodiment:

DETAILED DESCRIPTION

Figure 2:
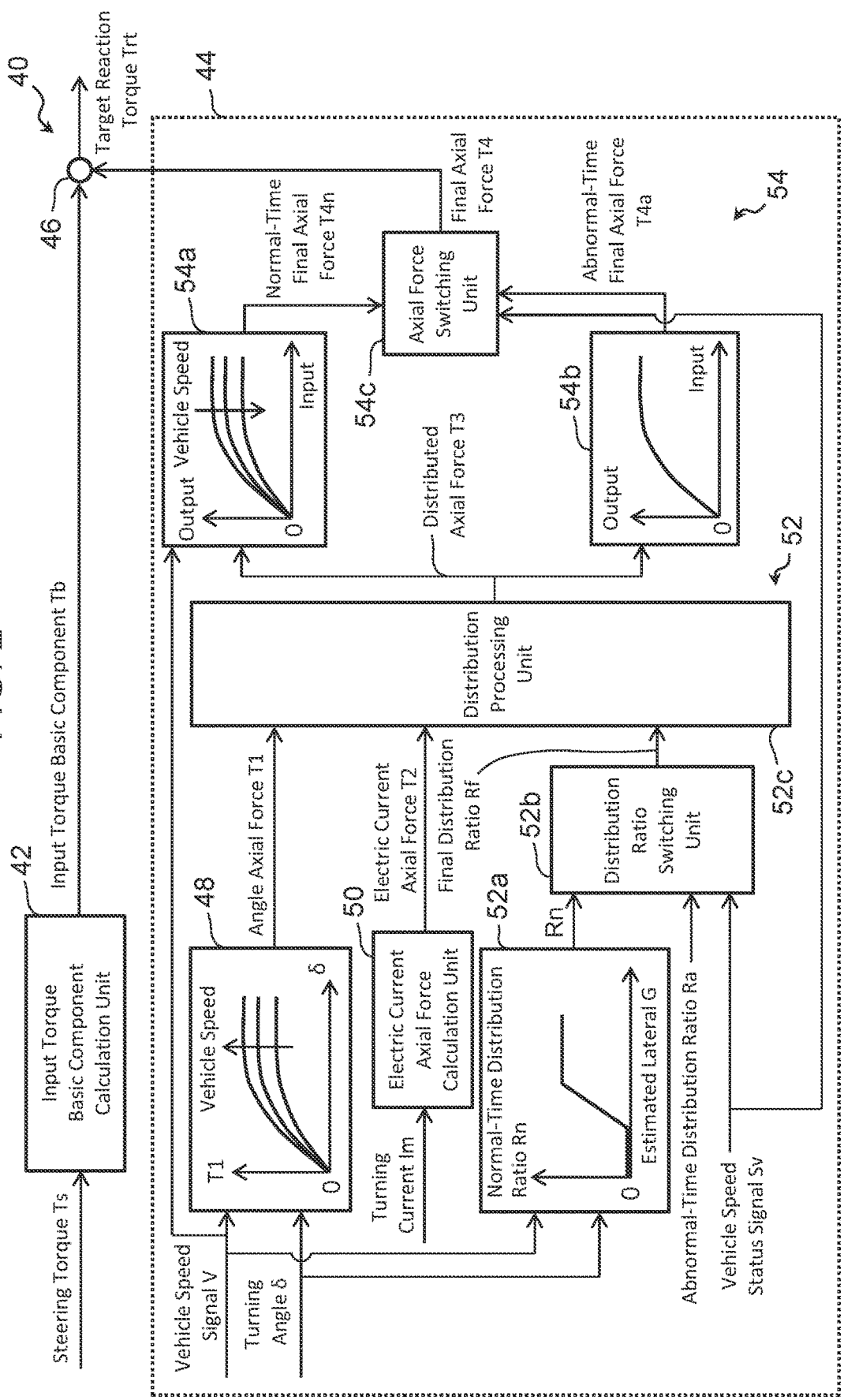
FIG. 2 is a diagram showing a basic configuration of a reaction torque calculation process executed by an electronic control unit.

It is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment

1-1. Configuration of Steering Device

FIG. 1 is a diagram schematically showing an example of a configuration of a steering device 10 according to a first embodiment. The steering device 10 is mounted on a vehicle. The steering device 10 includes a steering wheel 12 that is operated by a driver of the vehicle. The steering device 10 is of a steer-by-wire type, and the steering wheel 12 is mechanically separated from wheels (turning wheels) 1.

The steering wheel 12 is coupled to a reaction force actuator 16 via a steering shaft 14. The reaction force actuator 16 is a reaction force motor, for example. The reaction force actuator 16 applies a steering reaction torque Tr to the steering wheel 12.

A steering angle sensor 18 is attached to the steering shaft 14. The steering angle sensor 18 detects a rotation angle of the steering wheel 12, that is, a steering angle (actual steering angle) θ. Also, a steering torque sensor 20 is attached to the steering shaft 14. The steering torque sensor 20 detects a torque acting on the steering shaft 14, that is, a steering torque Ts.

The steering device 10 includes a turning device 22 configured to turn the turning wheels 1. The turning device 22 includes a turning actuator 24, a turning shaft (rack shaft) 26, tie rods 28, and a turning angle sensor 30. The turning actuator 24 is, for example, a turning motor and is attached to the turning shaft 26. The turning wheels 1 are connected to the turning shaft 26 through the tie rods 28.

By driving the turning actuator 24 to linearly move the turning shaft 26 in the axial direction thereof, the turning angle (actual turning angle) δ of the turning wheels 1 is changed through the tie rods 28. The turning angle sensor 30 is attached to the turning actuator 24. There is always a unique correlation between the rotation angle of the turning actuator 24 and the turning angle δ of the turning wheels 1. Therefore, the turning angle sensor 30 detects a turning angle δ of the turning wheels 1. A turning current sensor 32 detects a turning current Im that drives the turning actuator 24.

The steering device 10 further includes an electronic control unit (ECU) 34 configured to control the steering device 10 (the reaction force actuator 16 and the turning actuator 24). More specifically, the ECU 34 includes at least one processor 34a and at least one storage device 34b. The processor 34a executes various processes relating to the control of the reaction force actuator 16 and the turning actuator 24. The storage device 34b stores various programs and various data (including maps) used for the processing by the processor 34a. The processor 34a reads and executes a program from the storage device 34b, thereby realizing the processing by the ECU 34. It should be noted that a plurality of ECUs may be provided as the ECU 34. Specifically, for example, an ECU for controlling the reaction force actuator 16 and an ECU for controlling the turning actuator 24 may be individually provided.

Various sensors used for the control of the steering device 10 by the ECU 34 are connected to the ECU 34 directly or via a communication network built in the vehicle. The various sensors include, for example, a vehicle speed sensor 36 together with the steering angle sensor 18, the steering torque sensor 20, the turning angle sensor 30, and the turning current sensor 32 that are described above. The vehicle speed sensor 36 outputs a signal (vehicle speed signal V) responsive to the vehicle speed which is the speed of the vehicle.

The ECU 34 controls the turning actuator 24 such that the actual turning angle δ of the turning wheels 1 approaches a target turning angle δt. The ECU 34 calculates the target turning angle δt based on, for example, the steering angle θ and the vehicle speed. More specifically, the ECU 34 controls the turning current Im based on a deviation between the target turning angle δt and the actual turning angle δ. As a result, the turning wheels 1 are turned by the turning actuator 24.

1-2. Reaction Force Control

The ECU 34 is configured to perform reaction force control. Specifically, the ECU 34 controls the steering reaction torque Tf applied to the steering wheel 12 by controlling the reaction force actuator 16. The ECU 34 executes a "reaction torque calculation process" to calculate a target reaction torque Trt which is a target value of the steering reaction torque Tf. It should be noted that the following various kinds of calculation in the reaction torque calculation process is repeatedly executed at predetermined calculation cycles.

1-2-1. Basic Configuration of Reaction Torque Calculation Process

FIG. 2 is a diagram showing a basic configuration of the reaction torque calculation process executed by the ECU 34. The ECU 34 includes a target reaction torque calculation unit 40 for executing the reaction torque calculation process. The target reaction torque calculation unit 40 includes an input torque basic component calculation unit 42 and a reaction force component calculation unit 44. It should be noted that, as will be described below, the final reaction torque calculation process used in the first embodiment is obtained by adding various processes shown in FIGS. 3, 4, and 6 to 11 described below to the basic configuration shown in FIG. 2.

The input torque basic component calculation unit 42 calculates an input torque basic component Tb which is a force for rotating the steering wheel 12 in the steering direction of the driver. More specifically, the steering torque Ts detected by the steering torque sensor 20 is input to the input torque basic component calculation unit 42. The input torque basic component calculation unit 42 calculates the input torque basic component Tb so as to have a greater absolute value when the absolute value of the steering torque Ts is greater.

The reaction force component calculation unit 44 calculates a reaction force component (also referred to as a final axial force) T4 according to a force that resists the rotation of the steering wheel 12 due to the steering of the driver, that is, according to an axial force that acts on the turning shaft 26 from the turning wheels 1. The reaction force component T4 corresponds to a calculated axial force that estimates the axial force acting on the turning shaft 26.

In a subtractor 46, the target reaction torque calculation unit 40 calculates, as the target reaction torque Trt, a value obtained by subtracting the reaction force component T4 from the input torque basic component Tb. The ECU 34 controls the reaction force actuator 16 so as to generate a steering reaction torque Tr according to the target reaction torque Trt calculated as described above.

More specifically, in order to calculate the final axial force (reaction force component) T4, the reaction force component calculation unit 44 includes an angle axial force calculation unit 48, an electric current axial force calculation unit 50, a distributed axial force calculation unit 52, and a final axial force calculation unit 54. The angle axial force calculation unit 48 and the electric current axial force calculation unit 50 calculate an angle axial force T1 and an electric current axial force T2, respectively. These axial forces T1 and T2 are calculated by the dimension of torque (N·m).

(Angle Axial Force Calculation)

The angle axial force calculation unit 48 calculates the angle axial force T1 based on the vehicle speed signal V of the vehicle speed sensor 36 and the turning angle δ detected by the turning angle sensor 30. A graph in FIG. 2 illustrates an example of the relationship defined in a map of the angle axial force T1. As shown in this graph, the angle axial force T1 is calculated so as to have a greater absolute value when the absolute value of the turning angle δ is greater, and to have a greater absolute value when the vehicle speed is higher. The angle axial force T1 calculated in this manner is an ideal value of the axial force, and corresponds to an axial force that does not include road surface information such as minute irregularities that do not affect the behavior of the vehicle in the lateral direction and steps that affect the behavior in the lateral direction.

(Electric Current Axial Force Calculation)

The electric current axial force calculation unit 50 calculates the electric current axial force T2 based on the turning current Im. The electric current axial force calculation unit 50 calculates the electric current axial force T2 so as to have a greater absolute value when the absolute value of the turning current Im is greater, assuming that the torque applied to the turning shaft 26 by the turning actuator 24 is balanced with the torque according to the force applied from the road surface with respect to the turning wheels 1.

(Distributed Axial Force Calculation)

In order to calculate a distributed axial force T3 obtained by distributing the angle axial force T1 and the electric current axial force T2 based on a final distribution ratio Rf, a distributed axial force calculation unit 52 includes a normal-time distribution ratio calculation unit 52a, a distribution ratio switching unit 52b, and a distribution processing unit 52c. The final distribution ratio Rf is a distribution ratio of the angle axial force T1 and the electric current axial force T2 in the distributed axial force T3. When the final distribution ratio Rf is 0, the distributed axial force T3 is equal to the angle axial force T1, and when the final distribution ratio Rf is 1, the distributed axial force T3 is equal to the electric current axial force T2.

When the vehicle speed signal V is normal, the normal-time distribution ratio Rn is selected as the final distribution ratio Rf. A graph in FIG. 2 shows an example of the relationship defined in a map of the normal-time distribution ratio Rn. For the calculation of the normal-time distribution ratio Rn, as an example, first, the normal-time distribution ratio calculation unit 52a calculates an estimated value (estimated lateral G) of the lateral G (lateral acceleration) of the vehicle on the basis of the vehicle speed signal V and the turning angle δ. Then, the normal-time distribution ratio Rn is calculated so as to have a value according to the estimated lateral G which is calculated. More specifically, as shown in the graph, the normal-time distribution ratio Rn is calculated so as to have a great absolute value in a region where the estimated lateral G is high.

As described above, the normal-time distribution ratio Rn is calculated as a value based on the vehicle speed signal V. Also, the storage device 34b stores an abnormal-time distribution ratio Ra which is used when the vehicle speed signal V becomes not normal (i.e., abnormal). The abnormal-time distribution ratio Ra is 1 (fixed value). That is, according to the abnormal-time distribution ratio Ra, the distribution ratio of the electric current axial force T2 is 100%. Thus, the abnormal-time distribution ratio Ra does not depend on the vehicle speed signal V.

A vehicle speed status signal Sv is input to the distribution ratio switching unit 52b together with the normal-time distribution ratio Rn and the abnormal-time distribution ratio Ra. The vehicle speed status signal Sv is a signal indicating a determination result of whether or not the vehicle speed signal V is normal. The vehicle speed status signal Sv is output so as to indicate an abnormality, for example, when the vehicle speed signal V indicates a value that cannot normally be taken, when the amount of change in the vehicle speed signal value from the previous value exceeds a preset threshold value, or when communication between the vehicle speed sensor 36 and the ECU 34 is interrupted. Based on the vehicle speed status signal Sv, the distribution ratio switching unit 52b selects the normal-time distribution ratio Rn as the final distribution ratio Rf when the vehicle speed signal V is normal, and selects the abnormal-time distribution ratio Ra as the final distribution ratio Rf when the vehicle speed signal V is not normal.

The final distribution ratio Rf is input to the distribution processing unit 52c together with the angle axial force T1 and the electric current axial force T2. The distribution processing unit 52c calculates the distributed axial force T3 obtained by distributing the angle axial force T1 and the electric current axial force T2 based on the final distribution ratio R.

(Final Axial Force Calculation)

The final axial force calculation unit 54 calculates the final axial force T4 for the calculation of the target reaction torque Trt. The final axial force T4 is calculated to correct the above-described distributed axial force T3 to the decreasing side. More specifically, the final axial force calculation unit 54 includes a normal-time axial force calculation unit 54a, an abnormal-time axial force calculation unit 54b, and an axial force switching unit 54c.

The distributed axial force T3 and the vehicle speed signal V are input to the normal-time axial force calculation unit 54a. The normal-time axial force calculation unit 54a calculates a normal-time final axial force T4n selected when the vehicle speed signal V is normal. A graph in FIG. 2 illustrates an example of the relationship defined in a map of the normal-time final axial force T4n. The input on the horizontal axis of this map is the distributed axial force T3, and the output on the vertical axis is the normal-time final axial force T4n. For the above-described purpose of reducing the final axial force T4 with respect to the distributed axial force T3, the input-output ratio, which is the ratio of output to input (=output/input), is a value within a range greater than 0 and smaller than 1. That is, this input-output ratio corresponds to a gain which is multiplied by the distributed axial force T3 for the calculation of the normal-time final axial force T4n. As an example, the input-output ratio in this map is set to be lower when the vehicle speed is higher.

As described above, the normal-time final axial force T4n is calculated as a value based on the vehicle speed signal V. Then, the distributed axial force T3 is input to the abnormal-time axial force calculation unit 54b. The abnormal-time axial force calculation unit 54b calculates, as a value according to the distributed axial force T3, an abnormal-time final axial force T4a selected when the vehicle speed signal V is not normal. A graph in FIG. 2 shows an example of the relationship defined in a map of the abnormal-time final axial force T4a. As shown in this graph, the abnormal-time final axial force T4a (i.e., output) is uniquely determined in accordance with the distributed axial force T3. As described above, the abnormal-time final axial force T4a does not depend on the vehicle speed signal V.

The normal-time final axial force T4n and the abnormal-time final axial force T4a are input to the axial force switching unit 54c. The axial force switching unit 54c selects the normal-time final axial force T4n as the final axial force T4 when the vehicle speed signal V is normal, and selects the abnormal-time final axial force T4a as the final axial force T4 when the vehicle speed signal V is not normal.

1-2-2. Various Processes Associated with Basic Configuration of Reaction Torque Calculation Process As described above with reference to FIG. 2, the angle axial force T1, the normal-time distribution ratio Rn, and the normal-time final axial force T4n are calculated based on the vehicle speed signal V. Therefore, when the vehicle speed signal V becomes abnormal, an unintended steering reaction torque Tr may be output. More specifically, regarding the calculation of the angle axial force T1, when the vehicle speed signal value fluctuates because the vehicle speed signal V becomes abnormal, the angle axial force T1 fluctuates and thereby an unintended steering reaction torque Tr may be output. Also, regarding the calculation of the distributed axial force T3, if the vehicle speed signal value fluctuates before the switching to the abnormal-time distribution ratio Ra is completed after the vehicle speed signal V becomes abnormal, the normal-time distribution ratio Rn fluctuates and thereby an unintended steering reaction torque Tr may be output. Similarly, if the vehicle speed signal value fluctuates before the switching to the abnormal-time final axial force T4a is completed after the vehicle speed signal V becomes abnormal, the normal-time final axial force T4n fluctuates and thereby an unintended steering reaction torque Tr may be output.

In view of this kind of issue, according to the first embodiment, the reaction torque calculation process having the basic configuration shown in FIG. 2 is executed in association with various processes described below with reference to FIGS. 3, 6 (or 8), and 10. These various processes are executed when the vehicle speed signal V becomes abnormal (i.e., when an abnormality occurs).

Additionally, after the vehicle speed signal V becomes abnormal due to the reasons such as a communication abnormality, the vehicle speed signal V may return to the normal state. After the vehicle speed signal V returns to the normal state, if the vehicle speed signal V used for the calculation of the angle axial force T1 is instantaneously switched to the true value (i.e., the vehicle speed signal value obtained after returning to the normal state), the angle axial force T1 fluctuates and thereby an unintended steering reaction torque Tr may be output. Also, if the vehicle speed signal V instantaneously switches to the true value (the vehicle speed signal value obtained after returning to the normal state) or gradually changes to the true value while the switching to the abnormal-time distribution ratio Ra is not completed, the normal-time distribution ratio Rn fluctuates, and an unintended steering reaction torque Tr may be output. Similarly, after the vehicle speed signal V returns to the normal state, if the vehicle speed signal V instantaneously switches to the true value or gradually changes to the true value while the switching to the abnormal-time final axial force T4a is not completed, the normal-time final axial force T4n fluctuates and thereby an unintended steering reaction torque Tr may be output.

In view of this kind of issue, according to the first embodiment, the reaction torque calculation process having the basic configuration shown in FIG. 2 is executed in association with various processes described below with reference to FIGS. 4, 7 (or 9), and 11. These various processes are executed when the vehicle speed signal V returns to the normal state.

1-2-2-1. Measures for Angle Axial Force Calculation and its Effects

Figure 3:
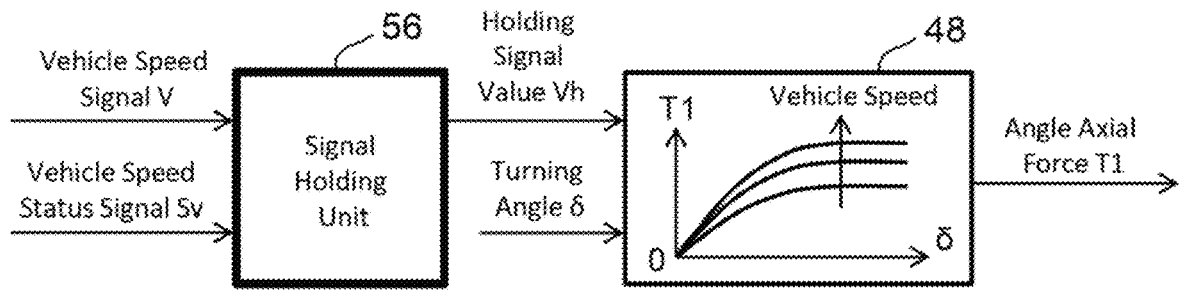
FIG. 3 is a block diagram used to describe measures for calculation of an angle axial force executed when an abnormality occurs in a vehicle speed signal.

FIG. 3 is a block diagram used to describe measures for the calculation of the angle axial force T1 executed when an abnormality occurs in the vehicle speed signal V. FIG. 3 (also FIG. 4) shows a part of the reaction torque calculation process shown in FIG. 2 related to the calculation of the angle axial force T1, and a block shown by a thick line corresponds to the measures described here.

The measures for the angle axial force calculation when an abnormality occurs are realized by a signal holding unit 56. The vehicle speed status signal Sv is input to the signal holding unit 56 together with the vehicle speed signal V. The signal holding unit 56 executes a process of holding the vehicle speed signal V that is input to the angle axial force calculation unit 48 at a vehicle speed signal value immediately before the vehicle speed signal V becomes abnormal. "The vehicle speed signal value immediately before the vehicle speed signal V becomes abnormal" mentioned here is, for example, a vehicle speed signal value in the calculation cycle immediately before a calculation cycle in which the vehicle speed status signal Sv starts to be output to indicate an abnormality (i.e., the previous value).

Hereinafter, for convenience of description, the vehicle speed signal value held by the signal holding unit 56 as described above is referred to as a "holding signal value Vh". The holding signal value Vh is input to the angle axial force calculation unit 48 for which the present measures are taken, together with the turning angle δ. The process of the signal holding unit 56 that holds the holding signal value Vh for the calculation of the angle axial force T1 executed by the angle axial force calculation unit 48 corresponds to an example of the "first abnormal-time process" according to the present disclosure.

According to the first abnormal-time process described above, when the vehicle speed signal V becomes abnormal, unintended fluctuation in the angle axial force T1 can be reduced, and as a result, the output of unintended steering reaction torque Tr can be reduced. As a result, it is possible to prevent the driver from feeling a sense of discomfort in steering due to the occurrence of an abnormality in the vehicle speed signal V.

Figure 4:
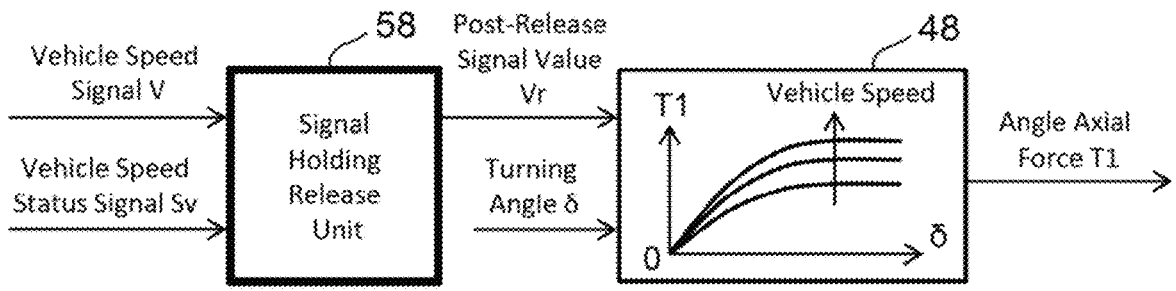
FIG. 4 is a block diagram used to describe measures for calculation of the angle axial force executed when the vehicle speed signal returns to the normal state.

FIG. 4 is a block diagram used to describe measures for the calculation of the angle axial force T1 executed when the vehicle speed signal V returns to the normal state. The measures to the angle axial force calculation at the time of returning to the normal state are realized by a signal holding release unit 58. The vehicle speed status signal Sv is input to the signal holding release unit 58 together with the vehicle speed signal V.

When the vehicle speed signal V returns to the normal state, the signal holding release unit 58 executes a process of gradually changing the vehicle speed signal V used for the calculation of the angle axial force T1. The gradual change of the vehicle speed signal V is performed from the holding signal value Vh obtained by the signal holding unit 56 (the first abnormal-time process) to a vehicle speed signal V (hereinafter, also referred to as the "true value") of the vehicle speed sensor 36 obtained after returning to the normal state. This process corresponds to an example of the "first release process" according to the present disclosure. Hereinafter, for convenience of description, the vehicle speed signal value at the time of gradual change after being released by the signal holding release unit 58 as described above is referred to as a "post-release signal value Vr". Until the gradual change is completed, this post-release signal value Vr is input to the angle axial force calculation unit 48.

Figure 5:
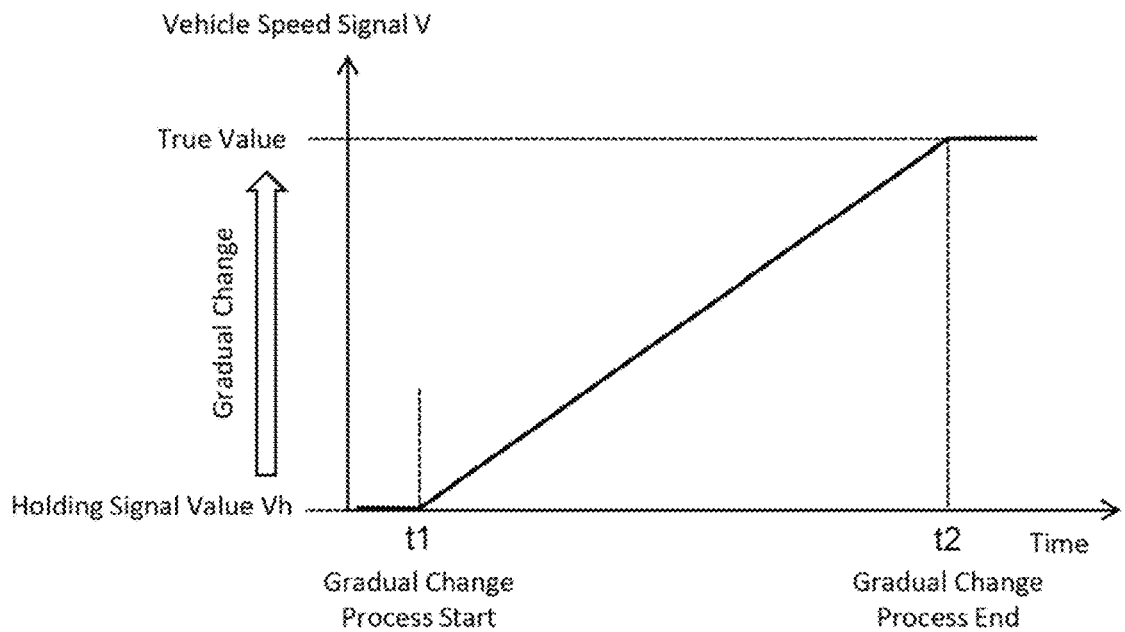
FIG. 5 is a time chart used to describe an example of gradual change of the vehicle speed signal performed by a signal holding release unit shown in FIG. 4.

FIG. 5 is a time chart used to describe an example of the gradual change of the vehicle speed signal V performed by the signal holding release unit 58 shown in FIG. 4. The release of the holding signal value Vh executed by the signal holding release unit 58 is started at a time point (calculation cycle) t1 at which the vehicle speed status signal Sv starts to indicate the normal state. In the example shown in FIG. 5, the gradual change is performed at a predetermined constant time change rate (i.e., gradient) (first gradual change method). Therefore, the vehicle speed signal V (post-release signal value Vr) output from the signal holding release unit 58 after the lapse of time point t1 gradually changes with a lapse of time toward the true value (i.e., the vehicle speed signal obtained after returning to the normal state) from the holding signal value Vh. Then, the gradual change is completed at a time point t2 at which the post-release signal value Vr reaches the true value. When the gradual change is completed, the process by the signal holding release unit 58 (the first release process) is completed. As a result, the vehicle speed signal V of the vehicle speed sensor 36 is input to the angle axial force calculation unit 48 as usual. It should be noted that FIG. 5 shows an example in which the post-release signal value Vr is gradually changed toward a vehicle speed higher than the holding signal value Vh. Also, the time required for completion of the gradual change changes depending on how the vehicle speed changes after returning to the normal state.

According to the first release process described above, when the vehicle speed signal V returns to the normal state, unintended fluctuation of the angle axial force T1 can be reduced, and as a result, the output of the unintended steering reaction torque Tr can be reduced. As a result, it is possible to prevent the driver from feeling a sense of discomfort in steering due to the return of the vehicle speed signal V to the normal state.

1-2-2-2. Measures for Distributed Axial Force Calculation and its Effects

Figure 6:
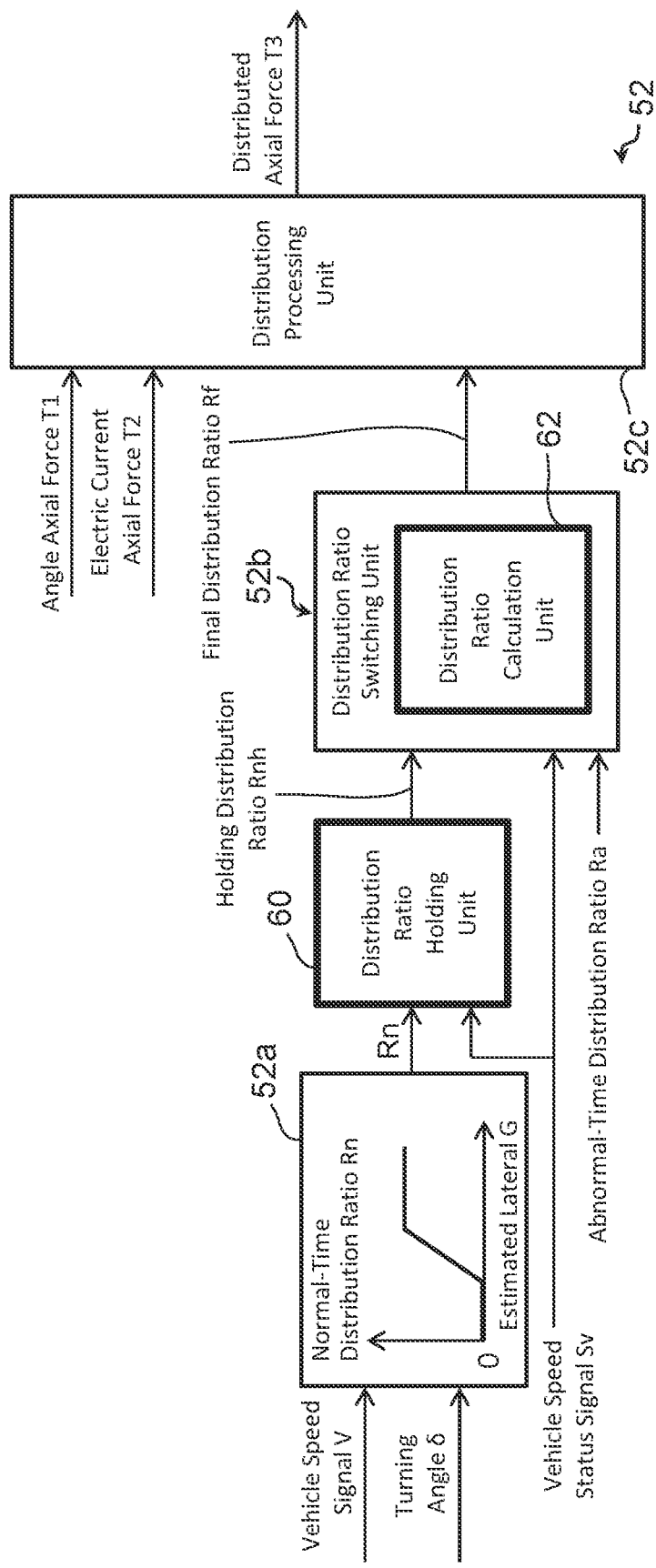
FIG. 6 is a block diagram used to describe an example of measures for calculation of a distributed axial force executed when an abnormality occurs in the vehicle speed signal.

FIG. 6 is a block diagram used to describe an example of measures for the calculation of the distributed axial force T3 executed when an abnormality occurs in the vehicle speed signal V. FIG. 6 (also, FIG. 7) shows a part of the reaction torque calculation process shown in FIG. 2 related to the calculation of the distributed axial force T3, and a block shown by a thick line corresponds to the measures described here. The measures for the calculation of the distributed axial force T3 in this example are realized by a distribution ratio holding unit 60 and a distribution ratio calculation unit 62.

The vehicle speed status signal Sv is input to the distribution ratio holding unit 60 together with the normal-time distribution ratio Rn. The distribution ratio holding unit 60 holds the normal-time distribution ratio Rn input to the distribution ratio switching unit 52b at a value immediately before the vehicle speed signal V becomes abnormal. "The value of the normal-time distribution ratio immediately before the vehicle speed signal V becomes abnormal" mentioned here is, for example, a value of the normal-time distribution ratio Rn in the calculation cycle immediately before a calculation cycle in which the vehicle speed status signal Sv starts to be output to indicate an abnormality (i.e., the previous value).

The distribution ratio calculation unit 62 is included in the distribution ratio switching unit 52b. The value of the normal-time distribution ratio Rn held by the distribution ratio holding unit 60 (hereinafter, also referred to as a "holding distribution ratio Rnh") is input to the distribution ratio calculation unit 62 together with the abnormal-time distribution ratio Ra and the vehicle speed status signal Sv. After the normal-time distribution ratio Rn is held by the distribution ratio holding unit 60, the distribution ratio calculation unit 62 gradually changes the final distribution ratio Rf from the holding distribution ratio Rnh to the abnormal-time distribution ratio Ra. The gradual change process by the distribution ratio calculation unit 62 can be executed, for example, by similarly using the first gradual change method shown in FIG. 5.

During the execution of the gradual change described above, the final distribution ratio Rf which is gradually changing is output to the distribution processing unit 52c. On the other hand, when the gradual change is completed, the process of the distribution ratio calculation unit 62 is ended. During a period in which the vehicle speed status signal Vs indicates an abnormality after the gradual change is completed, the abnormal-time distribution ratio Ra is output to the distribution processing unit 52c as the final distribution ratio Rf. The processes executed by the distribution ratio holding unit 60 and the distribution ratio calculation unit 62 described above correspond to an example of the "second abnormal-time process" according to the present disclosure.

According to the second abnormal-time process described above, when the vehicle speed signal V becomes abnormal, the fluctuation of the normal-time distribution ratio Rn can be reduced, and as a result, the output of the unintended steering reaction torque Tr can be reduced. As a result, it is possible to prevent the driver from feeling a sense of discomfort in steering due to the occurrence of an abnormality in the vehicle speed signal V.

Figure 7:
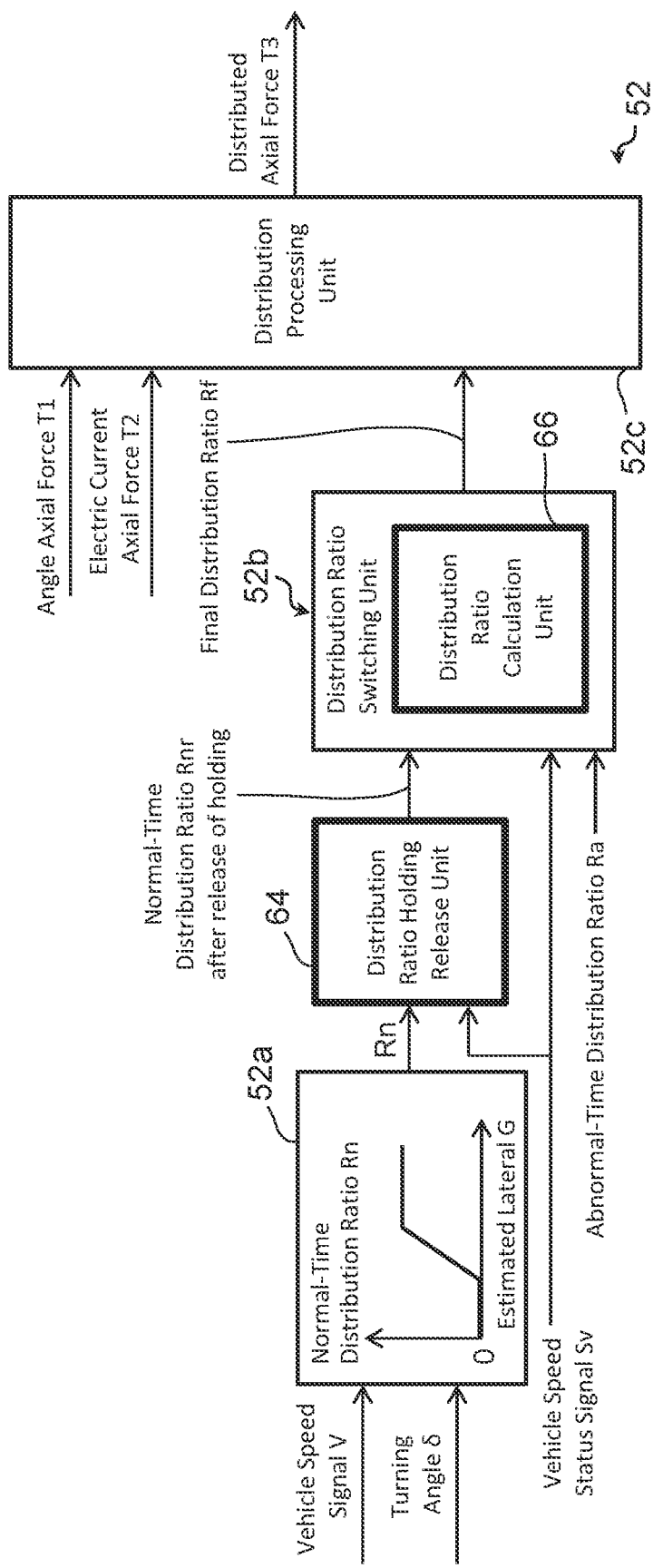
FIG. 7 is a block diagram used to describe an example of measures for calculation of the distributed axial force executed when the vehicle speed signal returns to the normal state.

FIG. 7 is a block diagram used to describe an example of measures for the calculation of the distributed axial force T3 executed when the vehicle speed signal V returns to the normal state. The measures for the calculation of the distributed axial force T3 in this example are realized by a distribution ratio holding release unit 64 and a distribution ratio calculation unit 66.

The vehicle speed status signal Sv is input to the distribution ratio hold release unit 64 together with the normal-time distribution ratio Rn. When the vehicle speed signal V returns to the normal state, the distribution ratio holding release unit 64 gradually changes the normal-time distribution ratio Rn from the holding distribution ratio Rnh to the true value (i.e., the normal-time distribution ratio Rn based on the vehicle speed signal V of the vehicle speed sensor 36 obtained after returning to the normal state). This gradual change process can also be executed, for example, by similarly using the first gradual change method shown in FIG. 5.

The normal-time distribution ratio Rnr after release of holding is input to the distribution ratio calculation unit 66 included in the distribution ratio switching unit 52b, together with the abnormal-time distribution ratio Ra and the vehicle speed status signal Sv. The distribution ratio calculation unit 66 gradually changes the final distribution ratio Rf to the normal-time distribution ratio Rn after the gradual change process by the distribution ratio holding release unit 64 is completed. More specifically, if the final distribution ratio Rf is equal to the abnormal-time distribution ratio Ra when the vehicle speed signal V returns to the normal state (that is, if the final distribution ratio Rf is completely (i.e., 100%) shifted to the abnormal-time distribution ratio Ra by the second abnormal-time process), the final distribution ratio Rf is gradually changed from the abnormal-time distribution ratio Ra to the normal-time distribution ratio Rn. On the other hand, if the final distribution ratio Rf is not completely shifted to the abnormal-time distribution ratio Ra when the vehicle speed signal V returns to the normal state, the final distribution ratio Rf is gradually changed from the present distribution ratio to the normal-time distribution ratio Rn.

The gradual change process by the distribution ratio calculation unit 66 can also be executed, for example, by similarly using the first gradual change method shown in FIG. 5. The processes by the distribution ratio holding release unit 64 and the distribution ratio calculation unit 66 described above correspond to an example of the "second release process" according to the present disclosure.

According to the second release process described above, when the vehicle speed signal V returns to the normal state, unintended fluctuation of the normal-time distribution ratio Rn can be reduced, and as a result, the output of the unintended steering reaction torque Tr can be reduced. As a result, it is possible to prevent the driver from feeling a sense of discomfort in steering due to the return of the vehicle speed signal V to the normal state.

Next, another example of the measures for the distributed axial force calculation will be described with reference to FIGS. 8 and 9, instead of the example described with reference to FIGS. 6 and 7.

Figure 8:
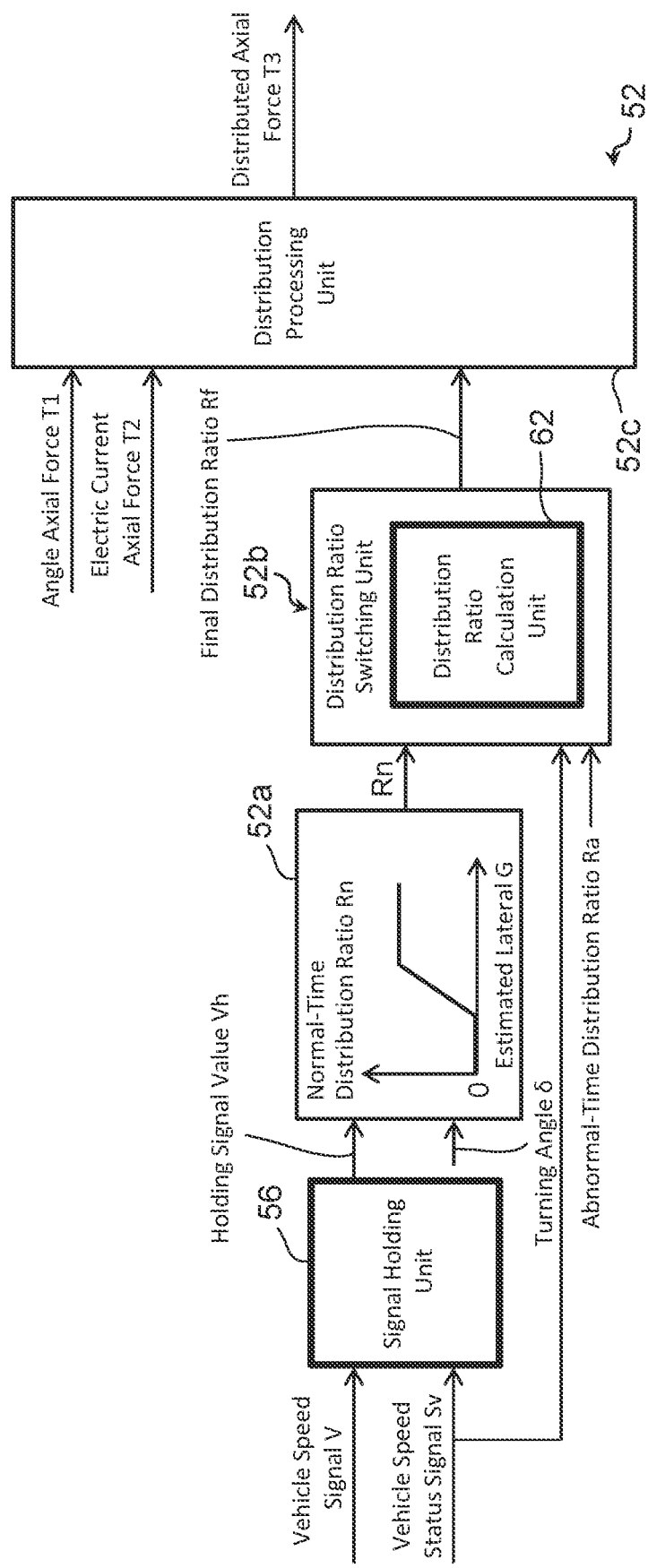
FIG. 8 is a block diagram used to describe another example of measures for the calculation of the distributed axial force executed when an abnormality occurs in the vehicle speed signal.

FIG. 8 is a block diagram used to describe another example of measures for the calculation of the distributed axial force T3 executed when an abnormality occurs in the vehicle speed signal V. The measures for the calculation of the distributed axial force T3 in this example are realized by the signal holding unit 56 and the distribution ratio calculation unit 62 described above.

Specifically, in the example shown in FIG. 8, instead of the holding of the normal-time distribution ratio Rn, a vehicle speed signal value (a holding signal value Vh) immediately before the vehicle speed signal V becomes abnormal is held by the signal holding unit 56 for the calculation of the normal-time distribution ratio Rn. This kind of method can also prevent the normal-time distribution ratio Rn from fluctuating due to an abnormal vehicle speed signal V (that is, can hold the normal-time distribution ratio Rn in a broad sense). Then, the distribution ratio calculation unit 62 gradually changes the final distribution ratio Rf from the normal-time distribution ratio Rn held by this kind of method to the abnormal-time distribution ratio Ra.

In the example shown in FIG. 8, the processes by the signal holding unit 56 and the distribution ratio calculation unit 62 correspond to another example of the "second abnormal-time process" according to the present disclosure. Also, even by the second abnormal-time process executed in this way, when the vehicle speed signal V becomes abnormal, the fluctuation of the normal-time distribution ratio Rn can be reduced, and as a result, the output of the unintended steering reaction torque Tr can be reduced.

Figure 9:
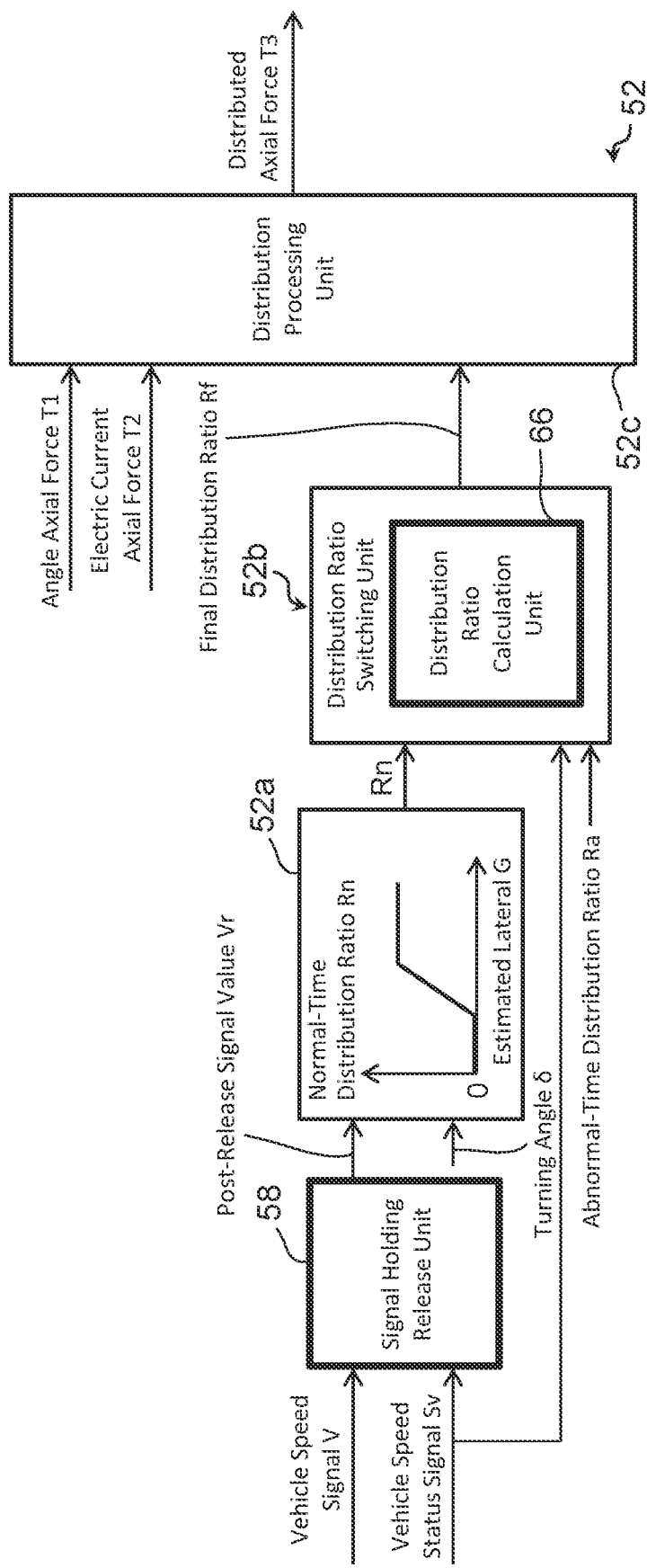
FIG. 9 is a block diagram used to describe another example of measures for the calculation of the distributed axial force executed when the vehicle speed signal returns to the normal state.

FIG. 9 is a block diagram used to describe another example of measures for the calculation of the distributed axial force T3 executed when the vehicle speed signal V returns to the normal state. The measures for the calculation of the distributed axial force T3 in this example are realized by the signal holding release unit 58 and the distribution ratio calculation unit 66 described above.

Specifically, in the example shown in FIG. 9, when the vehicle speed signal V returns to the normal state, the signal holding release unit 58 gradually changes the vehicle speed signal V used for the calculation of the normal-time distribution ratio Rn, from the holding signal value Vh to the vehicle speed signal V (true value) of the vehicle speed sensor 36 obtained after returning to the normal state. Then, after the gradual change process by the signal holding release unit 58 is completed, the distribution ratio calculation unit 66 gradually changes the final distribution ratio Rf to the normal-time distribution ratio Rn.

In the example shown in FIG. 9, the processes by the signal holding release unit 58 and the distribution ratio calculation unit 66 correspond to an example of the "third release process" according to the present disclosure. Also, even by the third release process executed in this way, when the vehicle speed signal V returns to the normal state, unintended fluctuation of the normal-time distribution ratio Rn can be reduced, and as a result, the output of the unintended steering reaction torque Tr can be reduced.

1-2-2-3. Measures for Final Axial Force Calculation and its Effects

Figure 10:
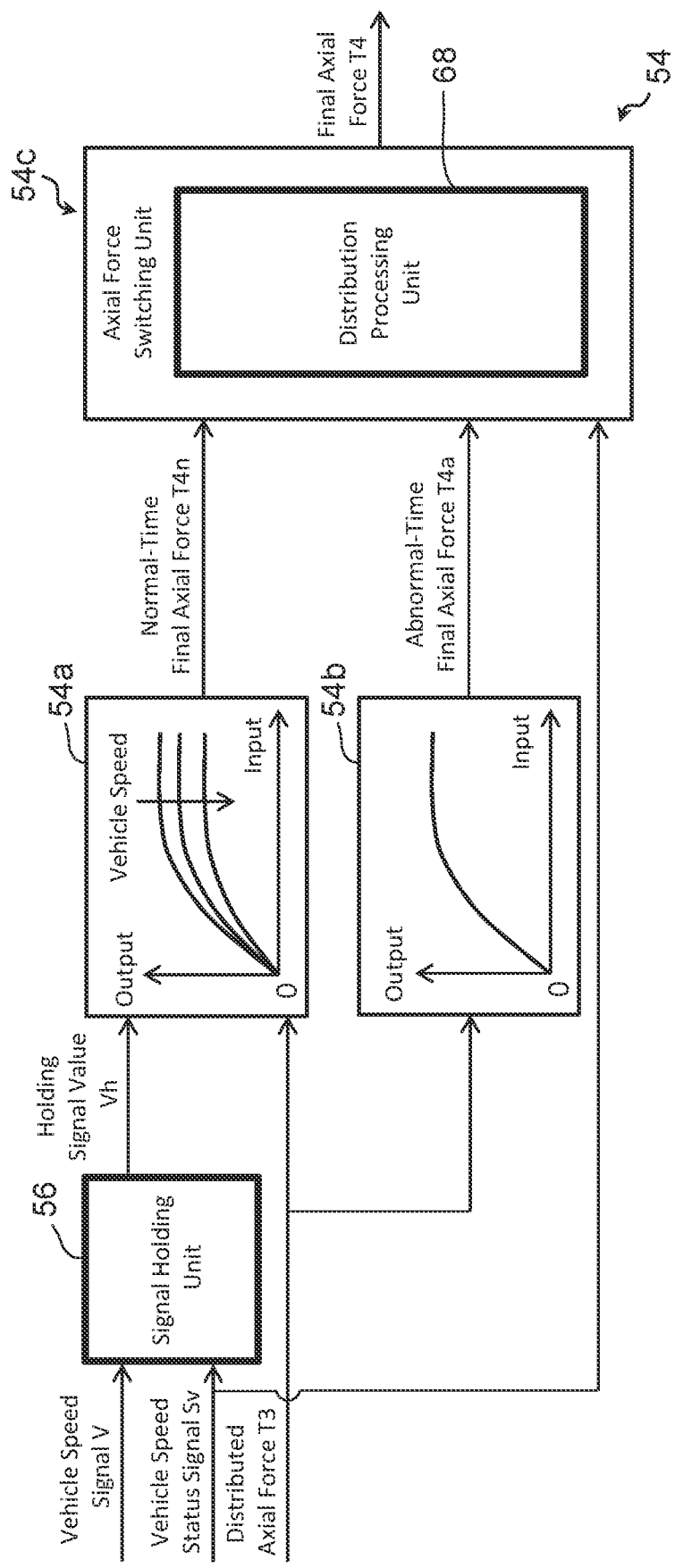
FIG. 10 is a block diagram used to describe an example of measures for calculation of a final axial force executed when an abnormality occurs in the vehicle speed signal.

FIG. 10 is a block diagram used to describe an example of measures for the calculation of the final axial force T4 executed when an abnormality occurs in the vehicle speed signal V. FIG. 10 (Also, FIG. 11) shows a part of the reaction torque calculation process shown in FIG. 2 related to the calculation of the final axial force T4, and a block shown by a thick line corresponds to the measures described here. The measures for the calculation of the final axial force T4 executed when an abnormality occurs are realized by the above-described signal holding unit 56 and a distribution processing unit 68 included in the axial force switching unit 54*c*.

In the example shown in FIG. 10, for the calculation of the normal-time final axial force T4*n*, the signal holding unit 56 holds a vehicle speed signal value (a holding signal value Vh) immediately before the vehicle speed signal V becomes abnormal. As a result, it is possible to prevent the normal-time final axial force T4*n* from fluctuating due to a vehicle speed signal V which is not normal (that is, it is possible to hold the normal-time final axial force T4*n* in a broad sense). Then, the distribution processing unit 68 gradually changes the final axial force T4 from the normal-time final axial force T4*n* to the abnormal-time final axial force T4*a*.

In the example shown in FIG. 10, the processes by the signal holding unit 56 and the distribution processing unit 68 correspond to an example of the "third abnormal-time process" according to the present disclosure. According to this third abnormal-time process, when the vehicle speed signal V becomes abnormal, the fluctuation of the normal-time final axial force T4*n* can be reduced, and as a result, the output of the unintended steering reaction torque Tr can be reduced. By also taking this kind of measures for the calculation of the final axial force T4 when an abnormality occurs in the vehicle speed signal V, it is possible to more effectively prevent the driver from feeling a sense of discomfort in steering.

Figure 11:
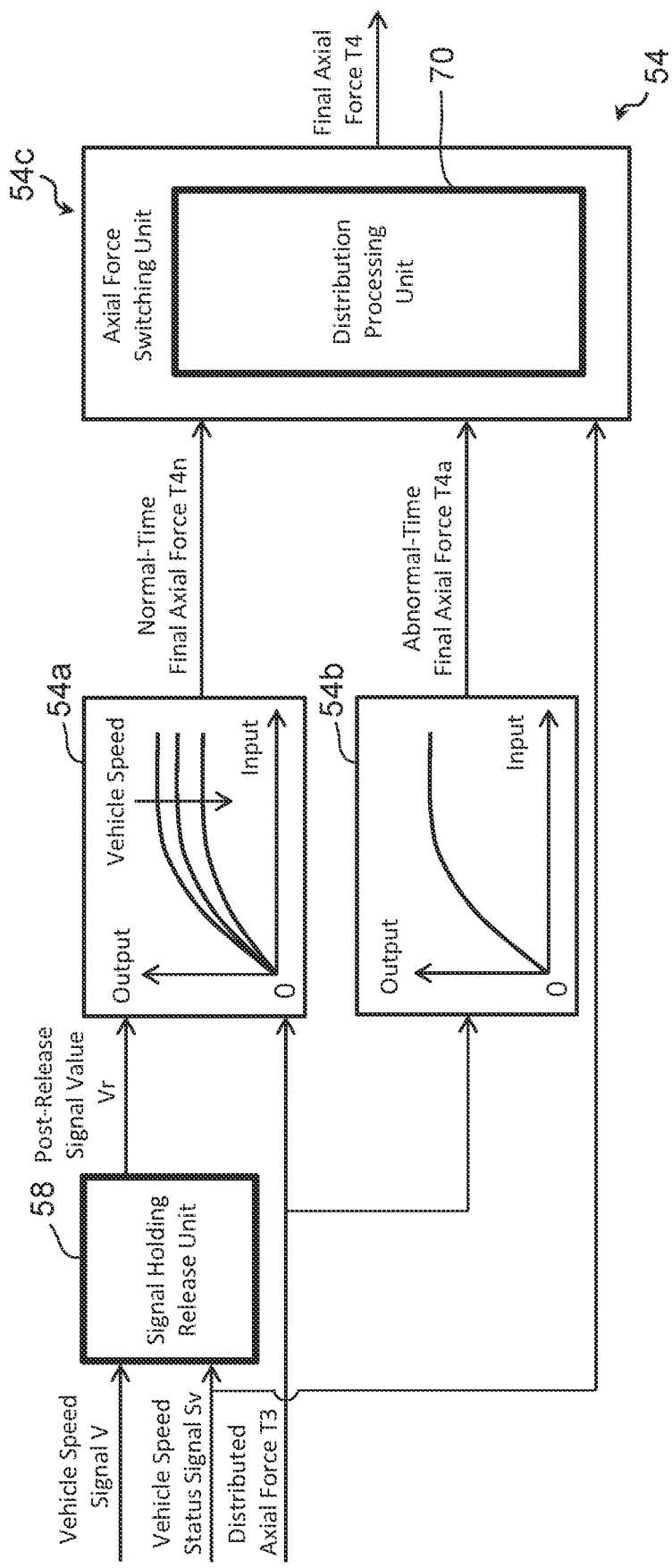
FIG. 11 is a block diagram used to describe an example of measures for calculation of the final axial force executed when the vehicle speed signal returns to the normal state.

FIG. 11 is a block diagram used to describe an example of measures for the calculation of the final axial force T4 executed when the vehicle speed signal V returns to the normal state. The measures for the calculation of the final axial force T4 executed when the vehicle speed signal V returns to the normal state are realized by the signal holding release unit 58 described above, a distribution processing unit 70 included in the axial force switching unit 54*c*.

In the example shown in FIG. 11, when the vehicle speed signal V returns to the normal state, the signal holding release unit 58 gradually changes the vehicle speed signal V used for the calculation of the normal-time final axial force T4*n* to a vehicle speed signal V (true value) of the vehicle speed sensor 36 after returning to the normal state, from the holding signal value Vh held by the signal holding unit 56 (the third abnormal-time process). Then, after the gradual change process of the vehicle speed signal V to the true value that is executed by the signal holding release unit 58 is completed, the distribution processing unit 70 gradually changes the final axial force T4 to the normal-time final axial force T4*n*.

In the example shown in FIG. 11, the processes by the signal holding release unit 58 and the distribution processing unit 70 correspond to an example of the "fourth release process" according to the present disclosure. According to this fourth release process, when the vehicle speed signal V returns to the normal state, unintended fluctuation of the normal-time final axial force T4*n* can be reduced, and as a result, the output of the unintended steering reaction torque Tr can be reduced. By also taking this kind of measures for the calculation of the final axial force T4 when the vehicle speed signal V returns to the normal state, it is possible to more effectively prevent the driver from feeling a sense of discomfort in steering.

Furthermore, on condition that the final axial force T4 is equal to the abnormal-time final axial force T4*a*, the signal hold release unit 58 may instantaneously change the vehicle speed signal V used for the calculation of the normal-time final axial force T4*n* from the holding signal value Vh to a vehicle speed signal V (true value) of the vehicle speed sensor 36 obtained after returning to the normal state, instead of the above-described gradual change of the vehicle speed signal V. If the final axial force T4 is equal to the abnormal-time final axial force T4*a* (that is, if the final axial force T4 is completely (i.e., 100%) shifted to the abnormal-time final axial force T4*a* by the third abnormal-time process), even when the vehicle speed signal V is instantaneously switched to the true value, this switching does not affect the final axial force T4. Then, switching of the final axial force T4 to the normal-time final axial force T4*n* using the vehicle speed signal V instantaneously switched to the true value is performed in association with the above-described gradual change process executed by the distribution processing unit 70. Therefore, by performing this kind of instantaneous change, it is possible to accelerate the switching of the final axial force T4 to the normal-time final axial force T4*n* without giving the driver a sense of discomfort in steering.

2. Second Embodiment

A "reaction torque calculation process" according to a second embodiment is different from that according to the first embodiment in that the target reaction torque Trt is calculated including a target return torque Tret calculated by a method described below.

2-1. Return Torque Calculation Process

The "reaction torque calculation process" according to the second embodiment includes a "return torque calculation process". The return torque calculation process is a process of calculating a target return torque Tret which is a target value of return torque Tre that acts to return the steering wheel 12 to the neutral position. According to the second embodiment, the ECU 34 adds the target return torque Tret calculated by the return torque calculation process to the final axial force T4 (see FIG. 2) and subtracts the resulting value from the input torque basic component Tb (see FIG. 2) to calculate the target reaction torque Trt.

Figure 12:
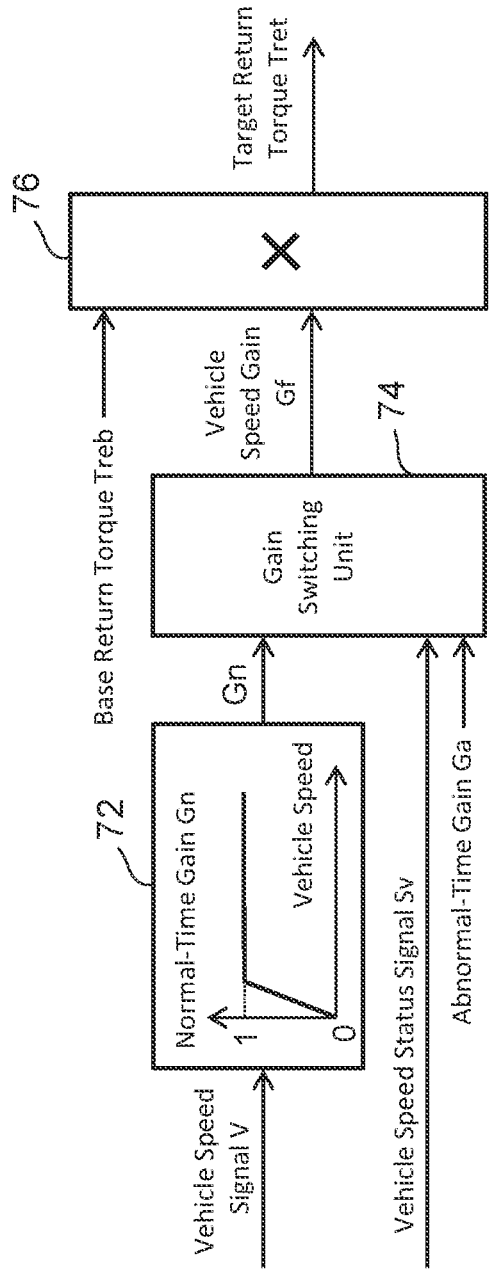
FIG. 12 is a diagram showing a basic configuration of a return torque calculation process executed by the electronic control unit.

FIG. 12 is a diagram showing a basic configuration of the return torque calculation process executed by the ECU 34. In order to execute the return torque calculation process, the ECU 34 includes a normal-time gain calculation unit 72, a gain switching unit 74, and a return torque calculation unit 76. The target return torque Tret is basically calculated by multiplying a vehicle speed gain Gf according to the vehicle speed signal V of the vehicle speed sensor 36 by a base return torque Treb.

Specifically, the normal-time gain calculation unit 72 calculates a normal-time gain Gn based on the vehicle speed signal V. The normal-time gain Gn is a vehicle speed gain selected when the vehicle speed signal V is normal. A graph in FIG. 12 shows an example of the relationship defined in a map of the normal-time gain Gn. As an example, as shown in this graph, the normal-time gain Gn is set to 0 when the vehicle speed is zero and increases with an increase in the vehicle speed, and is set to 1 in a high vehicle speed range.

An abnormal-time gain Ga and the vehicle speed status signal Sv are input to the gain switching unit 74 together with the normal-time gain Gn. The abnormal-time gain Ga is a designated value (for example, 1) of the vehicle speed gain selected when the vehicle speed signal V is not normal. That is, the abnormal-time gain Ga does not depend on the vehicle speed signal V. Based on the vehicle speed status signal Sv, the gain switching unit 74 selects the normal-time gain Gn as the final vehicle speed gain Gf when the vehicle speed signal V is normal, and selects the abnormal-time gain Ga as the vehicle speed gain Gf when the vehicle speed signal V is not normal.

The basic return torque Treb is input to the return torque calculation unit 76 together with the vehicle speed gain Gf. The basic return torque Treb is calculated to be, for example, a value according to the turning angle δ. The return torque calculation unit 76 calculates a target returning torque Tret by multiplying the vehicle speed gain Gf by the base return torque Treb.

As described above with reference to FIG. 12, the normal-time gain Gn is calculated based on the vehicle speed signal V. Therefore, after the vehicle speed signal V becomes abnormal, if the vehicle speed signal value fluctuates before the switching to the abnormal-time gain Ga is completed, the normal-time gain Gn fluctuates and thereby an unintended steering reaction torque Tr may be output. Moreover, after the vehicle speed signal V returns to the normal state, if the vehicle speed signal V instantaneously switches to the true value or is gradually changed to the true value before the switching to the abnormal-time gain Ga is completed, the normal-time gain Gn fluctuates and thereby an unintended steering reaction torque Tr may be output.

Figure 13:
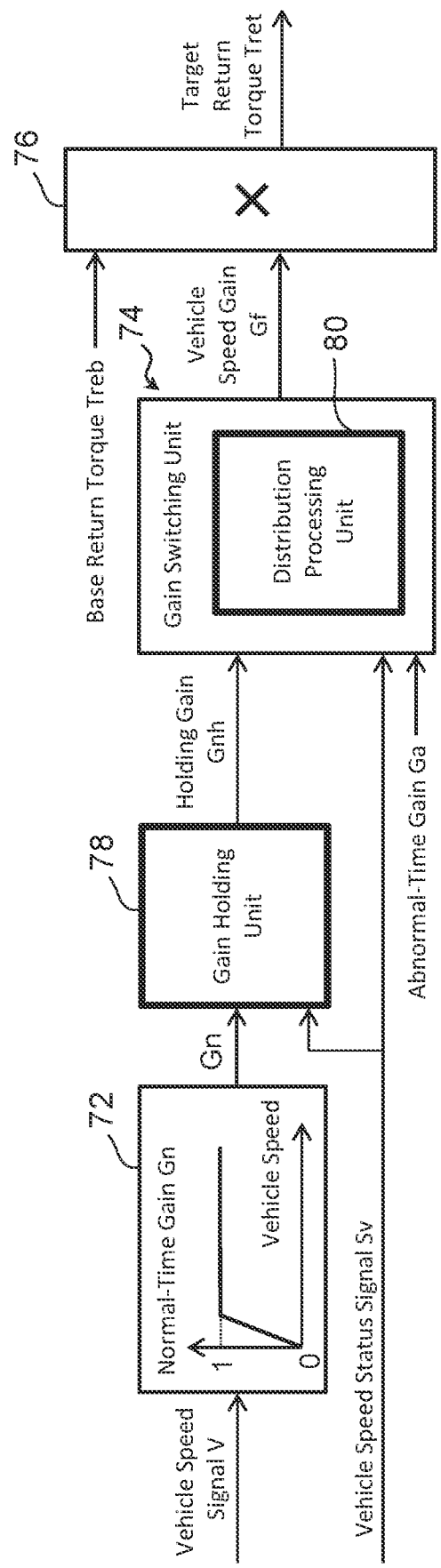
FIG. 13 is a block diagram used to describe an example of measures for calculation of a return torque executed when an abnormality occurs in the vehicle speed signal.
Figure 14:
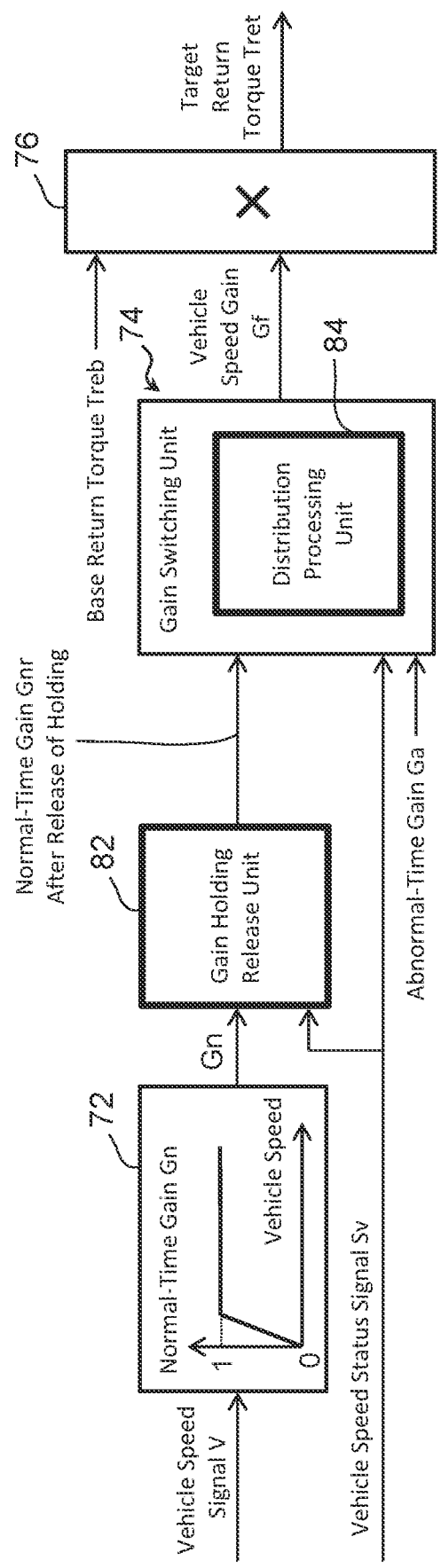
FIG. 14 is a block diagram used to describe an example of measures for calculation of the return torque executed when the vehicle speed signal returns to the normal state.
Figure 15:
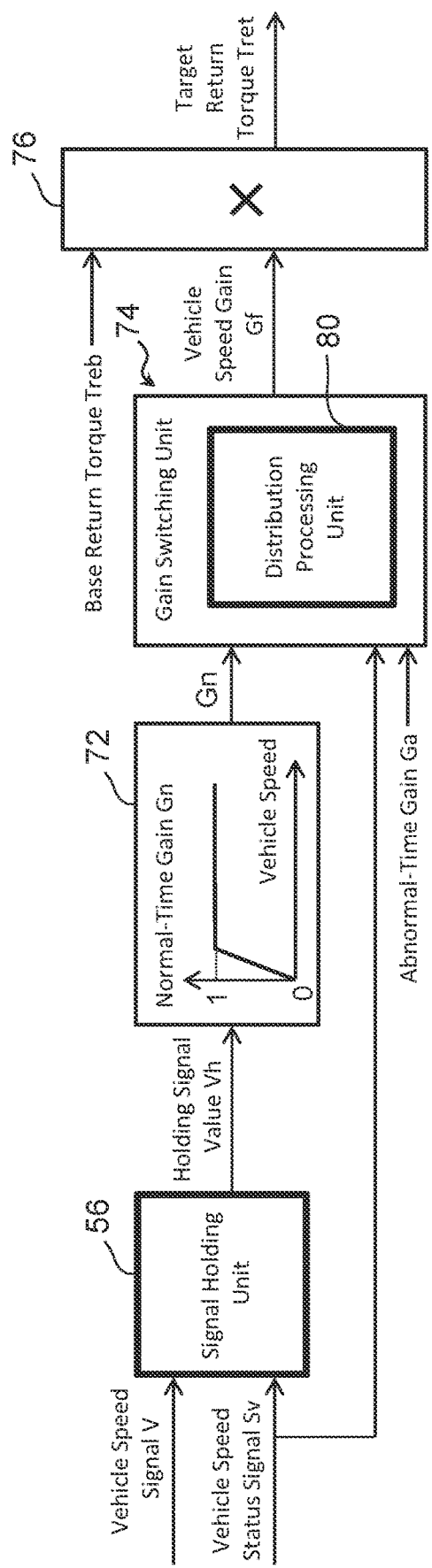
FIG. 15 is a block diagram used to describe another example of measures for the calculation of the return torque executed when an abnormality occurs in the vehicle speed signal.
Figure 16:
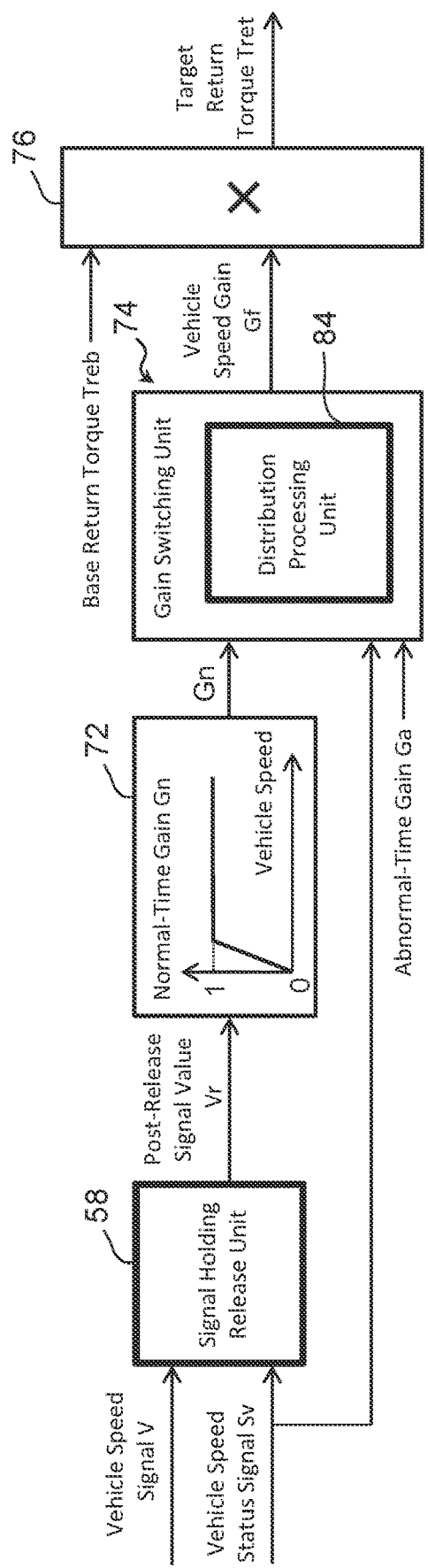
FIG. 16 is a block diagram used to describe another example of measures for the calculation of return torque executed when the vehicle speed signal returns to the normal state.

In view of this kind of issue, according to the second embodiment, the reaction torque calculation process having the basic configuration shown in FIG. 12 (more detail, the return torque calculation process included in the reaction torque calculation process) is executed in association with various processes described below with reference to FIGS. 13 and 14 (or FIGS. 15 and 16). More specifically, in an example in which the process shown in FIG. 13 is executed when an abnormality occurs in the vehicle speed signal V, the process shown in FIG. 14 is executed in combination with the process shown in FIG. 13. In addition, in an example in which the process shown in FIG. 15 is executed instead of the process shown in FIG. 13 when the abnormality occurs, the process shown in FIG. 16 is executed in combination with the process shown in FIG. 15.

2-2. Measures for Return Torque Calculation and its Effects

FIG. 13 is a block diagram used to describe an example of measures for the calculation of the return torque Tre executed when an abnormality occurs in the vehicle speed signal V. The measures for the calculation of the return torque Tre in this example are realized by a gain holding unit 78 and a distribution processing unit 80.

The vehicle speed status signal Sv is input to the gain holding unit 78 together with the normal-time gain Gn. The gain holding unit 78 holds the normal-time gain Gn input to the gain switching unit 74 at a value immediately before the vehicle speed signal V becomes abnormal (hereinafter, referred to as a "holding gain Gnh"). The holding gain Gnh is, for example, a value of the normal-time gain Gn in the calculation cycle immediately before a calculation cycle in which the vehicle speed status signal Sv starts to be output to indicate an abnormality (i.e., the previous value).

The distribution processing unit 80 is included in the gain switching unit 74. The holding gain Gnh held by the gain holding unit 78 is input to the distribution processing unit 80 together with the abnormal-time gain Ga and the vehicle speed status signal Sv. After the normal-time gain Gn is held by the gain holding unit 78, the distribution processing unit 80 gradually changes the vehicle speed gain Gf to the abnormal-time gain Ga from the holding gain Gnh. The gradual change process by the distribution processing unit 80 can be executed, for example, by similarly using the first gradual change method shown in FIG. 5. During a period in which the vehicle speed status signal Sv indicates an abnormality after the gradual change is completed, the abnormal-time gain Ga is output to the return torque calculation unit 76 as the vehicle speed gain Gf. The processes by the gain holding unit 78 and the distribution processing unit 80 described above correspond to an example of the "fourth abnormal-time process" according to the present disclosure.

According to the fourth abnormal-time process described above, when the vehicle speed signal V becomes abnormal, the fluctuation of the normal-time gain Gn can be reduced, and as a result, the output of the unintended steering reaction torque Tr can be reduced. As a result, when the vehicle speed signal V becomes abnormal, it is possible to more effectively prevent the driver from feeling a sense of discomfort in steering.

FIG. 14 is a block diagram used to describe an example of measures for the calculation of the return torque Tre executed when the vehicle speed signal V returns to the normal state. The measures for the calculation of the return torque Tre in this example are realized by a gain holding release unit 82 and a distribution processing unit 84.

The vehicle speed status signal Sv is input to the gain holding release unit 82 together with the normal-time gain Gn. When the vehicle speed signal V returns to the normal state, the gain holding release unit 82 gradually changes the normal-time gain Gn from the holding gain Gnh to the true value (i.e., the normal-time gain Gn based on the vehicle speed signal V of the vehicle speed sensor 36 obtained after returning to the normal state). This gradual change process can also be executed, for example, by similarly using the first gradual change method shown in FIG. 5.

The normal-time gain Gnr after releasing the holding is input to the distribution processing unit 84 included in the gain switching unit 74, together with the abnormal-time gain Ga and the vehicle speed status signal Sv. After the gradual change process to the true value by the gain holding release unit 82 is completed, the distribution processing unit 84 gradually changes the vehicle speed gain Gf to the normal-time gain Gn. This gradual change process can also be executed, for example, by similarly using the first gradual change method shown in FIG. 5. The processes by the gain holding release unit 82 and the distribution processing unit 84 described above correspond to an example of the "fifth release process" according to the present disclosure.

According to the fifth release process described above, when the vehicle speed signal V returns to the normal state, unintended fluctuation of the normal-time gain Gn can be reduced, and as a result, the output of the unintended steering reaction torque Tr can be reduced. As a result, when the vehicle speed signal V returns to the normal state, it is possible to more effectively prevent the driver from feeling a sense of discomfort in steering.

Furthermore, on condition that the vehicle speed gain Gf is equal to the abnormal-time gain Ga, the gain holding release unit 82 may instantaneously change the normal-time gain Gn from the holding gain Gnh to the true value, instead of the above-described gradual change of the normal-time gain Gn. If the vehicle speed gain Gf is equal to the abnormal-time gain Ga (i.e., if the vehicle speed gain Gf is completely (100%) shifted to the abnormal-time gain Ga by the fourth abnormal-time process), even when the normal-time gain Gn is instantaneously switched to the true value, this switching does not affect the vehicle speed gain Gf. Then, switching of the vehicle speed gain Gf to the normal-time gain Gn switched instantaneously to the true value is performed in association with the above-described gradual change process by the distribution processing unit 84. Therefore, by performing this kind of instantaneous change, it is possible to accelerate the switching of the vehicle speed gain Gf to the normal-time gain Gn without giving the driver a sense of discomfort in steering.

Next, FIG. 15 is a block diagram used to describe another example of measures for the calculation of the return torque Tre executed when an abnormality occurs in the vehicle speed signal V. The measures for the calculation of the return torque Tre in this example are realized by the signal holding unit 56 and the distribution processing unit 80 described above.

Specifically, in the example shown in FIG. 15, instead of holding the normal-time gain Gn, the vehicle speed signal value (i.e., the holding signal value Vh) immediately before the vehicle speed signal V becomes abnormal is held by the signal holding unit 56 for the calculation of the normal-time gain Gn. This kind of method can also prevent the normal-time gain Gn from fluctuating due to an abnormal vehicle speed signal V (that is, can hold the normal-time gain Gn in a broad sense). Then, the distribution processing unit 80 gradually changes the vehicle speed gain Gf to the abnormal-time gain Ga from the normal-time gain Gn held in this kind of manner.

In the example shown in FIG. 15, the processes by the signal holding unit 56 and the distribution processing unit 80 correspond to another example of the "fourth abnormal-time process" according to the present disclosure. Also, even by the fourth abnormal-time process executed in this manner, when the vehicle speed signal V becomes abnormal, the fluctuation of the normal-time gain Gn can be reduced, and as a result, the output of the unintended steering reaction torque Tr can be reduced.

FIG. 16 is a block diagram used to describe another example of measures for the calculation of the return torque Tre executed when the vehicle speed signal V returns to the normal state. The measures for the calculation of the return torque Tre in this example are realized by the signal holding release unit 58 and the distribution processing unit 84 described above.

Specifically, in the example shown in FIG. 16, when the vehicle speed signal V returns to the normal state, the signal holding release unit 58 gradually changes the vehicle speed signal V used for the calculation of the normal-time gain Gn from the holding signal value Vh to the vehicle speed signal V (true value) of the vehicle speed sensor 36 after returning to the normal state. Then, after the gradual change process of the vehicle speed signal V to the true value executed by the signal holding release unit 58 is completed, the distribution processing unit 84 gradually changes the vehicle speed gain Gf to the normal-time gain Gn.

In the example shown in FIG. 16, the processes by the signal holding release unit 58 and the distribution processing unit 84 correspond to an example of the "sixth release process" according to the present disclosure. Also by the sixth release process executed in this manner, when the vehicle speed signal V returns to the normal state, unintended fluctuation of the normal-time gain Gn can be reduced, and as a result, the output of the unintended steering reaction torque Tr can be reduced.

Furthermore, on condition that the vehicle speed gain Gf is equal to the abnormal-time gain Ga, the signal holding release unit 58 may instantaneously change the vehicle speed signal V used for the calculation of the normal-time gain Gn from the holding signal value Vh to the vehicle speed signal V (true value) of the vehicle speed sensor 36 after returning to the normal state, instead of the above-described gradual change of the vehicle speed signal V. If the vehicle speed gain Gf is equal to the abnormal-time gain Ga (that is, if the vehicle speed gain Gf is completely (100)%) shifted to the abnormal-time gain Ga by the fourth abnormal-time process), even when the vehicle speed signal V is instantaneously switched to the true value, this switching does not affect the vehicle speed gain Gf. Then, switching of the vehicle speed gain Gf to the normal-time gain Gn using the vehicle speed signal V that is instantaneously switched to the true value is performed in association with the above-described gradual change process executed by the distribution processing unit 84. Therefore, by performing this kind of instantaneous change, it is possible to accelerate the switching of the vehicle speed gain Gf to the normal-time gain Gn without giving the driver a sense of discomfort in steering.

3. Another Gradual Change Method

In the first and second embodiments described above, each of the signal holding release unit 58, the distribution ratio calculation unit 62, the distribution ratio holding release unit 64, the distribution ratio calculation unit 66, the distribution processing unit 68, the distribution processing unit 70, the distribution processing unit 80, the gain holding release unit 82, and the distribution processing unit 84 uses the first gradual change method exemplified with reference to FIG. 5 to perform gradual change in various processes included in the reaction torque calculation process. However, the method of gradual change performed by the signal holding release unit 58 or the other units described above is not limited to the first gradual change method described above, and the following second gradual change method, for example, may be used.

Figure 17:
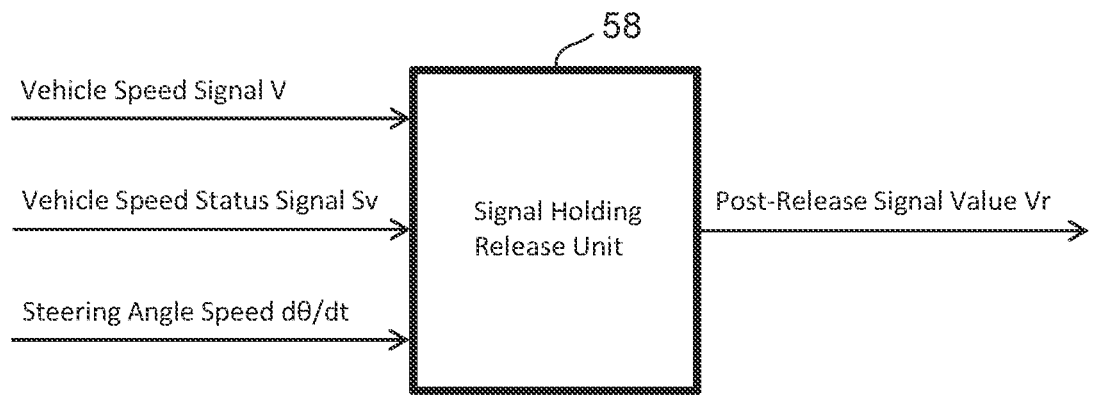
FIG. 17 is a block diagram showing a configuration of the signal holding release unit in an example of using a second gradual change method.

Hereinafter, the second gradual change method will be described by taking as an example the signal holding release unit 58 (first release process) that gradually changes the vehicle speed signal V used for the calculation of the angle axial force T1. FIG. 17 is a block diagram showing a configuration of the signal holding release unit 58 in an example of using the second gradual change method. When the second gradual change method is used, a steering speed $d\theta/dt$ of the steering wheel 12 is input to the signal holding release unit 58 together with the vehicle speed signal V and the vehicle speed status signal Sv. This steering speed $d\theta/dt$ is a time derivative value of the steering angle $\theta$ detected by the steering angle sensor 18.

According to the second gradual change method, the gradual change of the vehicle speed signal V is stopped when the steering speed $d\theta/dt$ input to the signal holding release unit 58 during execution of the gradual change process is lower than a predetermined threshold value TH. Also, when the steering speed $d\theta/dt$ is equal to or higher than the threshold value TH, the gradual change is performed at a higher rate of change (gradient) when the steering speed $d\theta/dt$ is higher.

Figure 18:
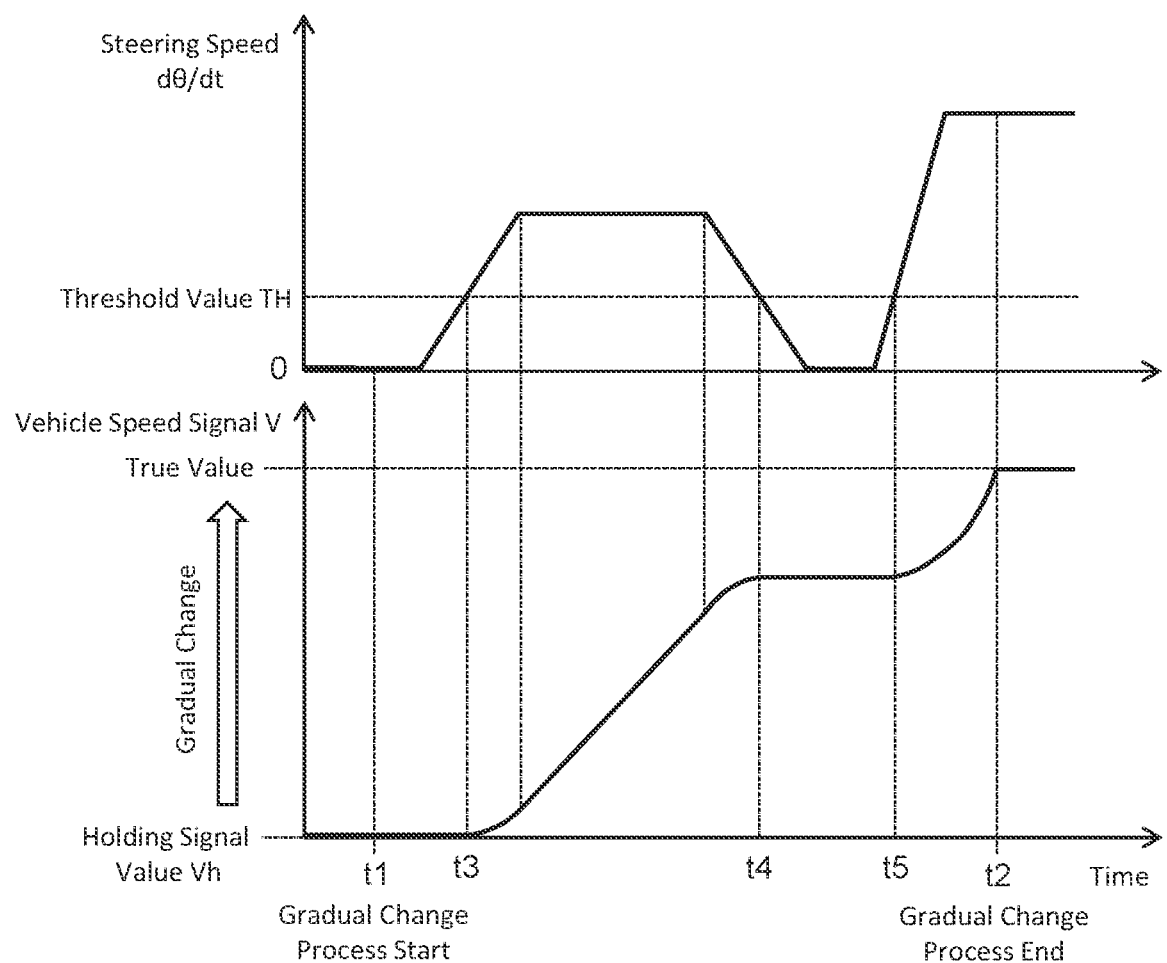
FIG. 18 is a time chart used to describe an example of the gradual change of the vehicle speed signal performed by the signal holding release unit using the second gradual change method.

FIG. 18 is a time chart used to describe an example of the gradual change of the vehicle speed signal V performed by the signal holding release unit 58 using the second gradual change method. The time points t1 and t2 in FIG. 18 are as described above with reference to FIG. 5. In the example shown in FIG. 18, the steering speed $d\theta/dt$ in a period from the start of the gradual change process at the time point t1 to the arrival of a time point 3 is lower than the threshold value TH. Therefore, the gradual change is stopped during this period. As a result, the vehicle speed signal V output from the signal holding release unit 58 remains the holding signal value Vh.

The steering speed $d\theta/dt$ in the subsequent period from the time point 3 to a time point t4 is equal to or higher than the threshold value TH. Therefore, during this period, the gradual change of the vehicle speed signal V is performed at a higher rate of change (gradient) when the steering speed $d\theta/dt$ is higher. More specifically, in response to an increase in the steering speed $d\theta/dt$, the rate of change of the vehicle speed signal V during the gradual change also increases. When the steering speed $d\theta/dt$ becomes a constant value thereafter, the rate of change of the vehicle speed signal V during the gradual change also becomes a constant value. Thereafter, in response to a decrease in the steering speed $d\theta/dt$, the rate of change of the vehicle speed signal V during the gradual change also decreases.

The steering speed $d\theta/dt$ in the subsequent period from the time point t4 to a time point t5 is again lower than the threshold value TH. Therefore, the gradual change is stopped. As a result, the vehicle speed signal V output from the signal holding release unit 58 maintains the value at the time point t4.

When the time point t5 arrives and the steering speed $d\theta/dt$ becomes equal to or higher than the threshold value TH again, the gradual change is resumed. Then, at the time point t2 when the vehicle speed signal V reaches the true value, the gradual change is completed (i.e., the gradual change process is ended).

According to the second gradual change method described above, the gradual change is performed while the driver is steering. Then, the gradual change is performed at a higher rate of change when the steering speed $d\theta/dt$ of the steering by the driver is higher. As a result, in comparison with the above-described first gradual change method, it is possible to make it more difficult to give the driver a sense of discomfort in steering due to a change in the vehicle speed signal V output from the signal holding release unit 58.

The second gradual change method described above with reference to FIGS. 17 and 18 may be similarly used for the gradual change in various other processes associated with the above-described reaction torque calculation process, as described below.

Second abnormal-time process: Gradual change of the final distribution ratio Rf

Second release process: Gradual change of at least one of the normal-time distribution ratio Rn and the final distribution ratio Rf Third release process: Gradual change of at least one of the vehicle speed signal V used for the calculation of the normal-time distribution ratio Rn, and the final distribution ratio Rf Third abnormal-time process. Gradual change of the final axial force T4

Fourth release process: Gradual change of at least one of the vehicle speed signal V used for the calculation of the normal-time final axial force T4*n*, and the final axial force T4

Fourth abnormal-time process: Gradual change of the vehicle speed gain Gf

Fifth release process: Gradual change of at least one of the normal-time gain Gn and the vehicle speed gain Gf Sixth release process: Gradual change of at least one of the vehicle speed signal V used for the calculation of the normal-time gain Gn, and the vehicle speed gain Gf 4. Various Other Embodiments In the first and second embodiments described above, an example in which the final axial force calculation is utilized for the calculation of the target reaction torque Trt has been described. However, the "target reaction torque" according to the present disclosure does not necessarily have to be calculated in association with the final axial force calculation. Specifically, the target reaction torque Trt may be calculated, for example, by subtracting the distributed axial force T3 according to the distributed axial force calculation from the input torque basic component Tb (see FIG. 2).

Furthermore, the "reaction torque calculation process" according to the present disclosure may be executed together with either one of the first and second abnormal-time processes, instead of the first and second embodiments in which both the first and second abnormal-time processes are used. Also, the "reaction torque calculation process" according to the present disclosure is not limited to the examples of the combination described in the first and second embodiments, and may be executed by freely combining at least one of the first and second abnormal-time processes with one or more of the other processes (i.e., the first to sixth release processes, and the third and fourth abnormal-time processes).

What is claimed is:

1. A steering device of a steer-by-wire type, comprising:
a steering wheel mechanically separated from a turning wheel;
a reaction force actuator configured to apply a steering reaction torque to the steering wheel; and
an electronic control unit configured to control the reaction force actuator and execute a reaction torque calculation process to calculate a target reaction torque which is a target value of the steering reaction torque, wherein in the reaction torque calculation process, the electronic control unit is configured to:
obtain a value of a vehicle speed signal and a previous value of the vehicle speed signal from a vehicle speed sensor;
determine that an abnormality condition is met or not met, the abnormality condition being that an amount of change in the value of the vehicle speed signal from the previous value of the vehicle speed signal exceeds a preset threshold value, or communication between the vehicle speed sensor and the electronic control unit is interrupted;

in response to the abnormality condition being met:
execute at least one of:
a first abnormal-time process to hold a vehicle speed signal value immediately before the abnormality condition starts; or
a second abnormal-time process to hold, for calculation of a normal-time distribution ratio, the vehicle speed signal value immediately before the abnormality condition starts or hold a value of the normal-time distribution ratio immediately before the abnormality condition starts, and then change a final distribution ratio to an abnormal-time distribution ratio; and
calculate, based on the final distribution ratio, a distributed axial force obtained by distributing an angle axial force and an electric current axial force, wherein the final distribution ratio is the abnormal-time distribution ratio where a distribution ratio of the electric current axial force is 100%; and in response to the abnormality condition not being met:
calculate, based on the final distribution ratio, a distributed axial force obtained by distributing the angle axial force and the electric current axial force, wherein the final distribution ratio is the normal-time distribution ratio based on the vehicle speed signal;
calculate the target reaction torque based on the distributed axial force; and
control the reaction force actuator to apply the steering reaction torque based on the target reaction torque.

2. The steering device according to claim 1, wherein
the reaction torque calculation process includes a first release process executed in response to the abnormality condition sending, and
the first release process changes the vehicle speed signal from the vehicle speed signal value held by the first abnormal-time process to the vehicle speed signal of the vehicle speed sensor obtained after the abnormality condition ends.

3. The steering device according to claim 1, wherein
the reaction torque calculation process includes a second release process executed in response to the abnormality condition sending, and
the second release process changes the normal-time distribution ratio from the vehicle speed signal value held by the second abnormal-time process to the normal-time distribution ratio based on the vehicle speed signal of the vehicle speed sensor obtained after the abnormality condition ends, and then changes the final distribution ratio to the normal-time distribution ratio.

4. The steering device according to claim 1, wherein
the reaction torque calculation process includes a third release process executed in response to the abnormality condition sending, and
the third release process changes the vehicle speed signal used for the calculation of the normal-time distribution ratio from the vehicle speed signal value held by the second abnormal-time process to the vehicle speed signal of the vehicle speed sensor obtained after the abnormality condition ends, and then changes the final distribution ratio to the normal-time distribution ratio.

5. The steering device according to claim 1, wherein
in the reaction torque calculation process, the electronic control unit is configured to select, as a final axial force for calculation of the target reaction torque, a normal-time final axial force based on the vehicle speed signal of the vehicle speed sensor and the distributed axial force in response to the abnormality condition not being met, and select, as the final axial force, an abnormal-time final axial force based on the distributed axial force in response to the abnormality condition being met,
the reaction torque calculation process includes a third abnormal-time process executed in response to the abnormality condition starting, and
the third abnormal-time process holds a vehicle speed signal value immediately before the abnormality condition starts for calculation of the normal-time final axial force, and then changes the final axial force to the abnormal-time final axial force.

6. The steering device according to claim 5, wherein
the reaction torque calculation process includes a fourth release process executed in response to the abnormality condition sending, and
the fourth release process is executed to:
change the vehicle speed signal used for the calculation of the normal-time final axial force from the vehicle speed signal value held by the third abnormal-time process to the vehicle speed signal of the vehicle speed sensor obtained after the abnormality condition ends, or instantly change the vehicle speed signal used for the calculation of the normal-time final axial force to the vehicle speed signal of the vehicle speed sensor obtained after the abnormality condition ends in response to the final axial force is-being equal to the abnormal-time final axial force; and
then change the final axial force to the normal-time final axial force.

7. The steering device according to claim 1, wherein
the target reaction torque includes a target return torque which is a target value of return torque that acts to return the steering wheel to a neutral position,
the target return torque is calculated by multiplying a base return torque by a vehicle speed gain,
in the reaction torque calculation process, the electronic control unit is configured to select, as the vehicle speed gain, a normal-time gain based on the vehicle speed signal of the vehicle speed sensor abnormality condition is not met, and select, as the vehicle speed gain, an abnormal-time gain being a designated value in response to the abnormality condition is being met,
the reaction torque calculation process includes a fourth abnormal-time process executed in response to the abnormality condition starting, and
the fourth abnormal-time process holds a vehicle speed signal value immediately before the abnormality condition starts for calculation of the normal-time gain or holds a value of the normal-time gain immediately before the abnormality condition starts, and then changes the vehicle speed gain to the abnormal-time gain.

8. The steering device according to claim 7, wherein
the reaction torque calculation process includes a fifth release process executed in response to the abnormality condition sending, and
the fifth release process is executed to:
change the normal-time gain from the vehicle speed signal value held by the fourth abnormal-time process to the vehicle speed signal of the vehicle speed sensor obtained after the abnormality condition ends, or instantly change the normal-time gain to a value based on the vehicle speed signal of the vehicle speed sensor obtained after the abnormality condition ends on condition that the vehicle speed gain is equal to the abnormal-time gain; and then change the vehicle speed gain to the normal-time gain.

9. The steering device according to claim 7, wherein
the reaction torque calculation process includes a sixth release process executed in response to the abnormality condition ending, and
the sixth release process is executed to:
  change the vehicle speed signal used for the calculation of the normal-time gain from the vehicle speed signal value held by the fourth abnormal-time process to the vehicle speed signal of the vehicle speed sensor obtained after the abnormality condition ends, or instantly change the vehicle speed signal used for the calculation of the normal-time gain to the vehicle speed signal of the vehicle speed sensor obtained after the abnormality condition ends on condition that the vehicle speed gain is equal to the abnormal-time gain; and
  then change the vehicle speed gain to the normal-time gain.

10. The steering device according to claim 2, wherein
in the first release process, in response to a steering speed of the steering wheel being lower than a threshold value, the change of the vehicle speed signal is stopped, and in response to the steering speed being equal to or higher than the threshold value, the change of the vehicle speed signal is executed at a rate of change that increases when the steering speed increases.

11. The steering device according to claim 1, wherein
in the second abnormal-time process, in response to a steering speed of the steering wheel being lower than a threshold value, the change of the final distribution ratio is stopped, and in response to the steering speed being equal to or higher than the threshold value, the change of the final distribution ratio is executed at a rate of change that increases when the steering speed increases.

12. The steering device according to claim 3, wherein
in the second release process, in response to a steering speed of the steering wheel being lower than a threshold value, the change of at least one of the normal-time distribution ratio and the final distribution ratio is stopped, and in response to the steering speed being equal to or higher than the threshold value, the change of the at least one of the normal-time distribution ratio and the final distribution ratio is executed at a rate of change that increases when the steering speed increases.

13. The steering device according to claim 4, wherein
in the third release process, in response to a steering speed of the steering wheel being lower than a threshold value, the change of at least one of the vehicle speed signal used for the calculation of the normal-time distribution ratio, and the final distribution ratio is stopped, and in response to the steering speed being equal to or higher than the threshold value, the change of the at least one of the vehicle speed signal used for the calculation of the normal-time distribution ratio, and the final distribution ratio is executed at a rate of change that increases when the steering speed increases.

14. The steering device according to claim 5, wherein
in the third abnormal-time process, in response to a steering speed of the steering wheel being lower than a threshold value, the change of the final axial force is stopped, and in response to the steering speed being equal to or higher than the threshold value, the change of the final axial force is executed at a rate of change that increases when the steering speed increases.

15. The steering device according to claim 6, wherein
in the fourth release process, in response to a steering speed of the steering wheel being lower than a threshold value, the change of at least one of the vehicle speed signal used for the calculation of the normal-time final axial force, and the final axial force is stopped, and in response to the steering speed being equal to or higher than the threshold value, the change of the at least one of the vehicle speed signal used for the calculation of the normal-time final axial force, and the final axial force is executed at a rate of change that increases when the steering speed increases.

16. The steering device according to claim 7, wherein
in the fourth abnormal-time process, in response to a steering speed of the steering wheel being lower than a threshold value, the change of the vehicle speed gain is stopped, and in response to the steering speed being equal to or higher than the threshold value, the change of the vehicle speed gain is executed at a rate of change that increases when the steering speed increases.

17. The steering device according to claim 8, wherein
in the fifth release process, in response to a steering speed of the steering wheel being lower than a threshold value, the change of at least one of the normal-time gain and the vehicle speed gain is stopped, and in response to the steering speed being equal to or higher than the threshold value, the change of the at least one of the normal-time gain and the vehicle speed gain is executed at a rate of change that increases when the steering speed increases.

18. The steering device according to claim 9, wherein
in the sixth release process, in response to a steering speed of the steering wheel being lower than a threshold value, the change of at least one of the vehicle speed signal used for the calculation of the normal-time gain, and the vehicle speed gain is stopped, and in response to the steering speed being equal to or higher than the threshold value, the change of the at least one of the vehicle speed signal used for the calculation of the normal-time gain, and the vehicle speed gain is executed at a rate of change that increases when the steering speed increases.

19. A steering method applied to a vehicle of a steer-by-wire type, the steering method comprising a reaction torque calculation process to calculate a target reaction torque which is a target value of a steering reaction torque applied to a steering wheel mechanically separated from a turning wheel, wherein the reaction torque calculation process comprises:
  obtaining a value of a vehicle speed signal and a previous value of the vehicle speed signal from a vehicle speed sensor;
  determining that an abnormality condition is met or not met, the abnormality condition being that an amount of change in the value of the vehicle speed signal from the previous value of the vehicle speed signal exceeds a preset threshold value, or communication between the vehicle speed sensor and the electronic control unit is interrupted;

in response to the abnormality condition being met:
  executing at least one of:
    a first abnormal-time process to hold a vehicle speed signal value immediately before the abnormality condition starts; or
    a second abnormal-time process to hold, for calculation of a normal-time distribution ratio, the vehicle speed signal value immediately before the abnormality condition starts or hold a value of the normal-time distribution ratio immediately before the abnormality condition starts, and then change a final distribution ratio to an abnormal-time distribution ratio; and
  calculating, based on the final distribution ratio, a distributed axial force obtained by distributing an angle axial force and an electric current axial force, wherein the final distribution ratio is the abnormal-time distribution ratio where a distribution ratio of the electric current axial force is 100%; and in response to the abnormality condition not being met:
  calculating, based on the final distribution ratio, a distributed axial force obtained by distributing the angle axial force and the electric current axial force, wherein the final distribution ratio is the normal-time distribution ratio based on the vehicle speed signal;

calculating the target reaction torque based on the distributed axial force; and controlling the reaction force actuator to apply the steering reaction torque based on the target reaction torque.

* * * * *